(12) United States Patent
Wang et al.

(10) Patent No.: US 12,314,531 B2
(45) Date of Patent: May 27, 2025

(54) APPLICATION CLASSIFICATION METHOD, ELECTRONIC DEVICE, AND CHIP SYSTEM

(71) Applicant: Petal Cloud Technology Co., Ltd., Guangdong (CN)

(72) Inventors: Yunze Wang, Dongguan (CN); Xiyun Shi, Nanjing (CN); Xingwen Wang, Dongguan (CN); Shidu Ye, Dongguan (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/039,069

(22) PCT Filed: Nov. 26, 2021

(86) PCT No.: PCT/CN2021/133613
§ 371 (c)(1),
(2) Date: May 26, 2023

(87) PCT Pub. No.: WO2022/111640
PCT Pub. Date: Jun. 2, 2022

(65) Prior Publication Data
US 2024/0004515 A1  Jan. 4, 2024

(30) Foreign Application Priority Data

Nov. 30, 2020 (CN) .......................... 202011386893.X

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/04842* (2013.01); *G06F 3/0488* (2013.01)

(58) Field of Classification Search
CPC .............. G06F 3/04817; G06F 3/0482; G06F 3/04842; G06F 3/0488; G06F 3/04883; G06F 3/0484
See application file for complete search history.

(56) References Cited

U.S. PATENT DOCUMENTS

| | | | |
|---|---|---|---|
| 2014/0101616 A1* | 4/2014 | Kim ...................... | G06F 3/0482 715/846 |
| 2015/0058766 A1* | 2/2015 | Wang .................. | G06F 3/04817 715/765 |

(Continued)

FOREIGN PATENT DOCUMENTS

| CN | 104424221 | * | 3/2015 |
|---|---|---|---|
| CN | 104424221 A | | 3/2015 |
| CN | 11346812 | * | 10/2021 |

*Primary Examiner* — Cao H Nguyen
(74) *Attorney, Agent, or Firm* — WOMBLE BOND DICKINSON (US) LLP

(57) ABSTRACT

The application classification method includes: An electronic device obtains a first touch operation performed on a first folder on a display interface, where the first folder is any folder on the display interface, and the first folder includes at least one first application; and the electronic device displays at least one second application around the first folder in response to the first touch operation, where the at least one second application is an application that is in a third application and whose degree of matching the first folder is greater than a threshold, and the third application is an application that is not included in any folder on the display interface. According to the application classification method, an application that matches the first folder is displayed around the first folder, so that a user can quickly select an application that the user wants to store in the first folder.

18 Claims, 19 Drawing Sheets

(51) Int. Cl.
*G06F 3/04842* (2022.01)
*G06F 3/0488* (2022.01)

(56) References Cited

U.S. PATENT DOCUMENTS

| | | | |
|---|---|---|---|
| 2020/0272322 A1* | 8/2020 | Zhu | G06F 3/0482 |
| 2022/0075506 A1* | 3/2022 | Lim | G06F 3/0482 |
| 2023/0214086 A1* | 7/2023 | Liao | G06F 3/0488 |
| | | | 715/835 |

* cited by examiner

APPLICATION CLASSIFICATION METHOD, ELECTRONIC DEVICE, AND CHIP SYSTEM

This application is a national stage of International Application No. PCT/CN2021/133613, filed on Nov. 26, 2021, which claims priority to Chinese Patent Application No. 202011386893.X filed on Nov. 30, 2020. Both of the aforementioned applications are hereby incorporated by reference in their entireties.

TECHNICAL FIELD

This application relates to the field of terminal technologies, and in particular, to an application classification method, an electronic device, and a chip system.

BACKGROUND

With development of technologies, a storage capacity of a mobile phone of a user is increasingly large, and applications (APPs) in the mobile phone are increasingly abundant. Various APPs can enrich daily life of the user, but also bring many inconveniences to the user in management and use. To use the APP more efficiently, the user needs to manage a large quantity of APPs in the mobile phone. Otherwise, the APPs on a desktop are disorderly. It is also time-consuming for the user to search for an APP that needs to be used from the disorderly APPs.

SUMMARY

This application provides an application classification method, an electronic device, and a chip system, so that an application that is not stored in any folder can be conveniently classified, thereby improving efficiency that a user manages the application.

To achieve the foregoing objective, this application uses the following technical solutions.

According to a first aspect, an embodiment of this application provides an application classification method. The method includes: An electronic device obtains a first touch operation performed on a first folder on a display interface, where the first folder is any folder on the display interface, and the first folder includes at least one first application; and the electronic device displays at least one second application around the first folder in response to the first touch operation, where the at least one second application is an application that is in a third application and whose degree of matching the first folder is greater than a threshold, and the third application is an application that is not included in any folder on the display interface.

In this embodiment of this application, the electronic device obtains the first touch operation performed on the first folder on the display interface. Then, the electronic device displays the at least one second application around the first folder in response to the first touch operation. The at least one second application is the application that is in the third application (the application that is not included in any folder on the display interface of the electronic device) and whose degree of matching the first folder is greater than the threshold. An application that matches the first folder is displayed around the first folder, so that a user can quickly select an application that the user wants to store in the first folder. In this way, an application that is not stored in any folder is classified, thereby improving efficiency that the user manages and uses the application.

In some embodiments, the method includes: The electronic device obtains a second touch operation performed on a target application, where the target application is any application in the at least one second application; and the electronic device stores the target application in the first folder in response to the second touch operation.

In some embodiments, the first touch operation is a touch operation that is performed on the first folder and meets a preset condition.

For example, the preset condition may include at least one of the following: touch duration is greater than preset time; a quantity of touch points meets a preset quantity requirement; and a sliding track meets a preset track.

In an application scenario, the electronic device displays a plurality of third applications and a plurality of folders on the display interface. The third application is the application that is not stored in any folder. Then, the user may apply a touch operation whose touch duration is greater than the preset time (for example, the preset time is 3 seconds) to the first folder on the display interface.

In another application scenario, the electronic device displays a plurality of third applications and a plurality of folders on the display interface. The third application is the application that is not stored in any folder. Then, the user may apply a touch operation whose quantity of touch points is the preset quantity (for example, the preset quantity is 2) to the first folder on the display interface.

In another application scenario, the electronic device displays a plurality of third applications and a plurality of folders on the display interface. The third application is the application that is not stored in any folder. Then, the user may apply a touch operation to the first folder on the display interface, and a sliding track of the touch operation meets the preset track.

In another application scenario, the electronic device displays a plurality of third applications and a plurality of folders on the display interface. The third application is the application that is not stored in any folder. Then, the user may apply a touch operation whose quantity of touch points is the preset quantity (for example, the preset quantity is 2) and whose touch duration is greater than the preset time to the first folder on the display interface.

In another application scenario, the electronic device displays a plurality of third applications and a plurality of folders on the display interface. The third application is the application that is not stored in any folder. Then, the user may apply a touch operation whose quantity of touch points is the preset quantity (for example, the preset quantity is 2) to the first folder on the display interface, and a sliding track of the touch operation meets the preset track.

In some embodiments, the first touch operation may be applying a touch operation to the first folder and simultaneously pressing a first button, where the first button is one or more physical buttons in the electronic device, or one or more virtual buttons on the display interface of the electronic device.

In an application scenario, the electronic device displays a plurality of third applications and a plurality of folders on the display interface. The third application is the application that is not stored in any folder. Then, the user may apply a touch operation to the first folder on the display interface, and simultaneously apply a press operation to a physical button of the electronic device.

In another application scenario, the electronic device displays a plurality of third applications and a plurality of folders on the display interface. The third application is the application that is not stored in any folder. Then, the user may apply a touch operation to the first folder on the display interface, and simultaneously apply a press operation to a virtual button on the display interface of the electronic device.

In some embodiments, that the electronic device displays at least one second application around the first folder in response to the first touch operation includes: The electronic device determines a degree of matching between the third application and the first folder in response to the first touch operation; and the electronic device displays the at least one second application around the first folder, where the at least one second application is an application that is in the third application and whose degree of matching the first folder meets a preset condition.

In some embodiments, that the electronic device determines a degree of matching between the third application and the first folder in response to the first touch operation may include: The electronic device obtains first information in response to the first touch operation, where the first information includes information about the first folder and information about the first application; the electronic device obtains a category and a label of the third application in response to the first touch operation; and the electronic device determines the degree of matching between the third application and the first folder based on the category and the label of the third application and the first information.

In an embodiment, the information about the first folder may be information that can represent a category of the first folder, and the information about the first application may be information that can represent a category and a label of the first application. For example, the information about the first application may include information such as a name, the category, the label, and a creation time point of the first application, and the information about the first folder may include information such as a name, a description, and a creation time point of the first folder.

In an application scenario, the electronic device may obtain the first information by using a file system of the electronic device. For example, the electronic device obtains the name of the first folder. Then, the electronic device searches the file system for the information about the first folder and the information about the first application based on the name of the first folder.

For example, the electronic device may search the file system of the electronic device for manifest information of the first application in the first folder based on the name of the first folder. Then, the electronic device obtains the name and the creation time point of the first application from the manifest information. The electronic device may obtain the category and the label of the first application from an application store through crawling based on the name of the first application, and store the category and the label of the first application in a corpus of the electronic device.

In another application scenario, the information about the first folder and the information about the first application may be stored in a corpus of the electronic device. The corpus may be located in a file system of the electronic device. The electronic device may search the corpus for the information about the first folder and the information about the first application based on the name of the first folder.

In some embodiments, that the electronic device obtains a category and a label of the third application in response to the first touch operation may include: The electronic device obtains identification information of the third application in response to the first touch operation; and the electronic device crawls the category and the label of the third application from the application store based on the identification information of the third application.

For example, the electronic device may obtain the identification information of the third application by using the file system of the electronic device. For example, the electronic device may search the file system of the electronic device for manifest information of the third application, where the manifest information may be used as identification information of the third application. The manifest information of the third application includes a name of the third application.

In some embodiments, that the electronic device determines the degree of matching between the third application and the first folder based on the category and the label of the third application and the first information includes: The electronic device performs word segmentation processing on the identification information, the category, and the label of the third application; and the electronic device calculates the degree of matching between the third application and the first folder based on a word segmentation processing result.

The word segmentation processing result may be a keyword that represents the category and the label of the third application. For example, for an application A1, the word segmentation processing result may include: social communication, a friend circle, social networking, an emoticon, and the like.

The electronic device may calculate the degree of matching between the third application and the first folder based on the word segmentation processing result, the information about the first folder, and the information about the first application.

In some embodiments, that the electronic device calculates the degree of matching between the third application and the first folder based on a word segmentation processing result includes: The electronic device calculates the degree of matching between the third application and the first folder by using a preset algorithm based on the word segmentation processing result, where the preset algorithm is one or more of a naive Bayes algorithm, an association analysis algorithm, and a TF-IDF statistical algorithm.

The following describes how the electronic device calculates the degree of matching between the third application and the first folder by using the preset algorithm based on the word segmentation processing result.

It is assumed that a to-be-classified third APP is an $APP_y$, and the first folder includes p first APPs, which are respectively $x_1, x_2, \ldots, x_p$. y=1 indicates that the $APP_y$ belongs to the first folder (a positive sample), and y=0 indicates that the $APP_y$ does not belong to the first folder (a negative sample).

1. The electronic device calculates the degree of matching between the third application and the first folder based on the naive Bayes algorithm.

Block A1: The electronic device calculates, by using a naive Bayes formula, a score that the first folder to which the user applies the first touch operation stores a second application.

The naive Bayes formula is:

$$p(y=1 \mid x_1, x_2, \ldots, x_p) = \frac{p(x_1 \mid y=1)p(x_2 \mid y=1) \ldots p(x_p \mid y=1)p(y=1)}{p(x_1, x_2, \ldots, x_p)}.$$

For the first folder, when the electronic device calculates a conditional probability that the first folder stores one idle third $APP_y$, $\vec{x}=(x_1, x_2, \ldots, x_p)$ is fixed, and $\vec{x}=(x_1, x_2, \ldots, x_p)$ is an existing APP sequence in the first folder. Therefore, $p(x_1, x_2, \ldots, x_p)$ may be considered as one constant. Therefore, only a numerator part: $p(x_1|y=1)p(x_2|y=1) \ldots p(x_p|y=1)p(y=1)$ of the naive Bayes formula needs to be calculated.

$$p(x_j \mid y=1) = \frac{n_{11}}{n_{\cdot 1}}, \; p(y=1) = \frac{n_{\cdot 1}}{n}, \text{ and } j=1, 2, \ldots, p.$$

A calculation result of the numerator part of the naive Bayes formula is a score that the first folder stores an idle third $APP_y$.

$n_{\cdot 1}$ is a sum of $n_{11}$ and $n_{01}$, and n is APP list data in all folders of the electronic device. In $n_{ab}$, a first subscript a represents a prediction variable $x_j=1$ or $x_j=0$, and a second subscript b represents a target variable $y=1$ or $y=0$. For example, a first subscript 1 in $n_{10}$ represents a prediction variable $x_j=1$, and a second subscript 0 represents a target variable $y=0$.

Block A2: For each idle third $APP_y$, the electronic device repeats block A1 to obtain, through calculation, a score that the first folder stores each idle third $APP_y$.

The score that the first folder stores the idle third $APP_y$ is a degree of matching between the idle third $APP_y$ and the first folder. To be specific, a third $APP_y$ with a higher score indicates a higher degree of matching the first folder and a higher probability of being stored in the first folder.

For example, after obtaining, through calculation, the score that the first folder stores each idle third $APP_y$, the electronic device may sort, in descending order, the scores that the first folder stores all the idle third $APP_y$s. The electronic device displays, around the first folder based on a sorting result, a third $APP_y$ that is ranked in the front, so that the user selects an APP that needs to be stored in the first folder.

2. The electronic device calculates the degree of matching between the third application and the first folder based on the association analysis algorithm.

Block B1: The electronic device calculates a conditional probability that the first folder includes an $APP_j$ (namely, a positive sample), in other words, a degree of matching between the $APP_j$ and the first folder.

The conditional probability that the first folder includes the $APP_j$ is $$p(y=1 \mid x_j=1) = \frac{n_{11}}{n_{1\cdot}},$$

and a conditional probability that the first folder does not include the $APP_j$ is $$p(y=1 \mid x_j=0) = \frac{n_{01}}{n_{0\cdot}}$$

$n_{0\cdot}$ is a sum of $n_{00}$ and $n_{01}$, and $n_{1\cdot}$ is a sum of $n_{11}$ and $n_{10}$.

Block B2: The electronic device calculates a degree of matching between a third $APP_y$ to be stored in the first folder and the first folder.

In some embodiments, the electronic device may add up conditional probabilities that all APPs in the electronic device are included in the first folder $r=\Sigma_j p(y=1|x_j)$, to obtain the degree of matching between the third $APP_y$ and the first folder. r is a sum of degrees of matching between each third $APP_y$ and the first folder.

Block B3: For each third $APP_y$ that is not stored in the first folder, the electronic device repeats block B1 and block B2, to obtain a degree of matching between each third $APP_y$ and the first folder through calculation.

A third $APP_y$ with a higher degree of matching the first folder indicates a higher probability of being stored in the first folder. For example, after obtaining the degree of matching between each third $APP_y$ and the first folder through calculation, the electronic device may sort the degrees of matching between the third $APP_y$s and the first folder in descending order. The electronic device displays, around the first folder based on a sorting result, a third $APP_y$ that is ranked in the front, so that the user selects an APP that needs to be stored in the first folder.

3. The electronic device calculates the degree of matching between the third application and the first folder based on the TF-IDF statistical method.

A main idea of the TF-IDF is that if a word or a phrase appears frequently in an article (that is, a TF is high) and rarely appears in another article (that is, an IDF is high), it is considered that the word or the phrase has a good category differentiation capability and is suitable for classification.

Block C1: The electronic device obtains a name of a third $APP_y$ from a manifest file of each third $APP_y$, and crawls information such as a category and a label of each third APP from the application store.

Block C2: The electronic device performs word segmentation processing on the information such as the name of each third $APP_y$ and the category and the label of the third $APP_y$.

One third $APP_y$ corresponds to a plurality of keywords.

Block C3: The electronic device calculates a TF of the keyword of the third $APP_y$.

In some embodiments, for a keyword ti in the first folder, a word frequency of the keyword ti may be expressed as:

$$tf_{i,j} = \frac{n_{i,j}}{\sum_k n_{k,j}} \cdot n_{i,j}$$

represents a quantity of times that the keyword ti appears in the first folder, and $\Sigma_k n_{k,j}$ represents a sum of quantities of times that all words appear in the first folder.

Block C4: The electronic device calculates an IDF of the keyword of the third $APP_y$.

If there are fewer categories including a keyword w, it indicates that the keyword w has a good category differentiation capability. For example, an $IDF_w$ of the keyword w is that a total quantity C of categories is divided by a quantity $C_w$ of categories including the keyword w, and then a logarithm is obtained for a result.

For example, the $IDF_w$ of the keyword w may be $$IDF_w = \log\left(\frac{C}{C_w + 1}\right).$$

A denominator is increased by 1 to avoid a case in which the denominator is 0 for an article that does not include a keyword. A stronger capability of the keyword w to predict a topic indicates a greater weight of the keyword w. Conversely, a weaker capability of the keyword w to predict a topic indicates a smaller weight of the keyword w. Therefore, a TF-IDF of the keyword w is: TF–IDF=TF*IDF.

Block C5: The electronic device calculates TF-IDF values of all keywords of the third $APP_y$ relative to the first folder, and averages the TF-IDF values to obtain a TF-IDF of the third $APP_y$ relative to the first folder.

For example, an average value of the TF-IDF values of the keywords may be:

$$TF-IDF = \frac{\sum_{i=1}^{n} TF - IDF}{n}.$$

Block C6: For each third APP, the electronic device repeats block C3, block C4, and block C5, to obtain, through calculation, TF-IDFs of all third $APP_y$s relative to the first folder.

The TF-IDFs of the first folder and all the third $APP_y$s are degrees of matching between the third $APP_y$s and the first folder. A third $APP_y$ with a higher degree of matching the first folder indicates a higher probability of being stored in the first folder. For example, after obtaining, through calculation, the TF-IDFs of the third $APP_y$s and the first folder, the electronic device may sort the TF-IDFs of the third $APP_y$s relative to the first folder in descending order. The electronic device displays, around the first folder based on a sorting result, a third $APP_y$ that is ranked in the front, so that the user selects an APP that needs to be stored in the first folder.

4. The electronic device calculates the degree of matching between the third APP and the first folder based on a classification label of each first APP in the first folder.

Block D1: The electronic device obtains a quantity of first APPs in the first folder and a quantity of first APPs that are of a same type as a third $APP_y$ in the first folder.

The quantity of first APPs in the first folder is $$\sum_{i=1}^{p} 1,$$

and the quantity of first APPs that are of the same type as the third $APP_y$ in the first folder is $$\sum_{i=1}^{p} I(c_i = x).$$

Block D2: The electronic device calculates a degree of matching between the third $APP_y$ and the first folder.

The degree of matching between the third $APP_y$ and the first folder may be $$\frac{\sum_{i=1}^{p} I(c_i = x)}{\sum_{i=1}^{p} 1}.$$

Block D3: For each third $APP_y$, the electronic device repeats block D1 and block D2, to calculate degrees of matching between the first folder and all third $APP_y$s.

A third $APP_y$ with a higher degree of matching the first folder indicates a higher probability of being stored in the first folder. For example, after obtaining the degree of matching between each third $APP_y$ and the first folder through calculation, the electronic device may sort the degrees of matching between the third $APP_y$s and the first folder in descending order. The electronic device displays, around the first folder based on a sorting result, a third $APP_y$ that is ranked in the front, so that the user selects an APP that needs to be stored in the first folder.

In some embodiments, that the electronic device displays the at least one second application around the first folder includes: The electronic device determines a plurality of applications that are in the third application and that have highest degrees of matching the first folder as the second applications, where there are a plurality of second applications; and the electronic device displays the plurality of second applications around the first folder in a preset arrangement manner.

For example, the electronic device may arrange the plurality of second applications into a preset shape in descending order of the matching degrees, and display the second applications around the first folder.

In an application scenario, the plurality of second applications may be distributed as a first-layer application and a second-layer application, and each of the first-layer application and the second-layer application includes at least one of the plurality of second applications. In addition, the first-layer application is close to the first folder relative to the second-layer application. Then, the user may conveniently select the target application based on the second application displayed around the first folder, and store the target application in the first folder.

For example, the preset shape may be any shape such as a sector shape or a pyramid shape. This is not specifically limited in this embodiment of this application.

In some embodiments, after the target application is stored in the first folder, the method may include: The electronic device sorts each application in the first folder based on a quantity of use times and/or a download time point of the application.

The quantity of use times of the application may be a quantity of use times of the application in an electronic device, or may be a sum of quantities of use times of the application in a plurality of electronic devices. The download time point of the application may be a time point at which the application is installed in the electronic device. The electronic device may, by sorting applications in the first folder, set an icon of an application that is commonly used by the user at a front position in the first folder, so that it is more convenient for the user to select an application that needs to be used.

In some embodiments, after the electronic device stores the target application in the first folder, the electronic device may write information about the target application into a corpus, to update the corpus.

In some embodiments, after the electronic device stores the target application in the first folder, the electronic device may modify a relationship between the target application and the first folder in the file system to that the first folder includes the target application.

According to a second aspect, an embodiment of this application provides an application classification apparatus, including: a touch operation obtaining unit, configured to obtain a first touch operation performed on a first folder on a display interface, where the first folder is any folder on the display interface, and the first folder includes at least one first application; and a display unit, configured to display at least one second application around the first folder in response to the first touch operation, where the at least one second application is an application that is in a third application and whose degree of matching the first folder is greater than a threshold, and the third application is an application that is not included in any folder on the display interface.

According to a third aspect, an embodiment of this application provides an electronic device, including one or more processors, a memory, and a display. The memory and the display are coupled to the one or more processors. The memory is configured to store computer program code, and the computer program code includes computer instructions. When the one or more processors execute the computer instructions, the electronic device is enabled to perform the method according to any implementation of the first aspect.

According to a fourth aspect, an embodiment of this application provides a chip system. The chip system includes a processor. The processor is coupled to a memory, and the processor executes a computer program stored in the memory, to implement the method according to any implementation of the first aspect. The chip system may be a single chip or a chip module including a plurality of chips.

According to a fifth aspect, an embodiment of this application provides a chip system. The chip system includes a memory and a processor. The processor executes a computer program stored in the memory, to implement the method according to any implementation of the first aspect. The chip system may be a single chip or a chip module including a plurality of chips.

According to a sixth aspect, an embodiment of this application provides a computer program product. When the computer program product runs in an electronic device, the electronic device is enabled to perform the method according to any implementation of the first aspect.

According to a seventh aspect, an embodiment of this application provides a computer-readable storage medium. The computer-readable storage medium stores a computer program. When the computer program is executed by a processor, the method according to any implementation of the first aspect is implemented.

It may be understood that the application classification apparatus according to the second aspect, the electronic device according to the third aspect, the chip systems according to the fourth aspect and the fifth aspect, the computer program product according to the sixth aspect, and the computer-readable storage medium according to the seventh aspect are configured to perform the method provided in the first aspect. Therefore, for beneficial effects that can be achieved by them, refer to beneficial effects in the corresponding method. Details are not described herein again.

DESCRIPTION OF EMBODIMENTS

Figure 1A:
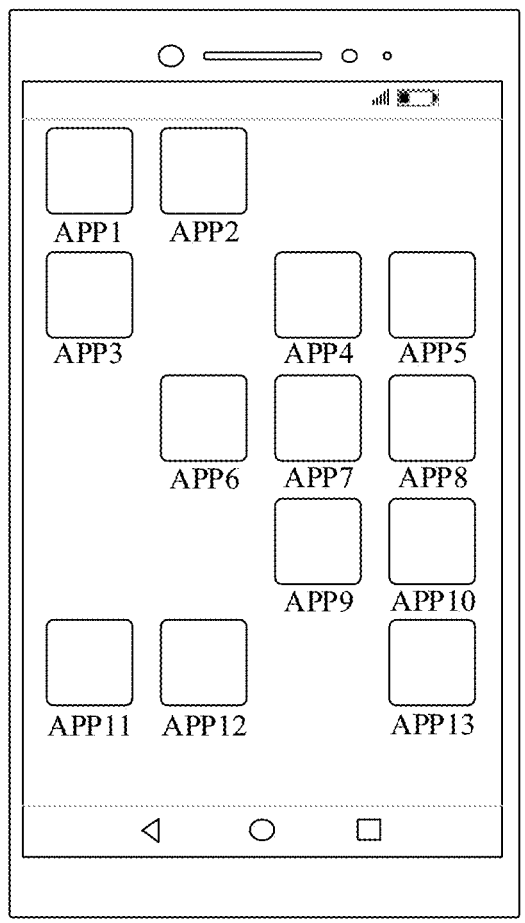
FIG. 1(a) and FIG. 1(b) are a schematic diagram of aligning icons of APPs on a display interface of a mobile phone according to a related technology.

In the following description, to illustrate rather than limit, specific details such as a particular system structure and a technology are provided to make a thorough understanding of embodiments of this application. However, a person skilled in the art should know that this application may be practiced in other embodiments without these specific details. In another case, detailed descriptions of a well-known system, apparatus, circuit, and method are omitted, so that this application is described without being obscured by unnecessary details.

It should be understood that, when used in the specification and the appended claims of this application, the term "include" indicates presence of the described features, integers, blocks, operations, elements, and/or components, but does not exclude presence or addition of one or more other features, integers, blocks, operations, elements, components, and/or sets thereof.

It should also be understood that the term "and/or" used in the specification and the appended claims of this application indicates any combination and all possible combinations of one or more of associated listed items, and includes these combinations.

As used in the specification and the appended claims of this application, according to the context, the term "if" may be interpreted as "when", "once", "in response to determining", or "in response to detecting". Similarly, according to the context, the phrase "if it is determined that" or "if (a described condition or event) is detected" may be interpreted as a meaning of "once it is determined that", "in response to determining", "once (the described condition or event) is detected", or "in response to detecting (the described condition or event)".

In addition, in the descriptions of the specification and the appended claims of this application, the terms "first", "second", "third", and the like are merely intended for distinguishing and description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in the specification do not necessarily mean referring to a same embodiment. Instead, the statements mean "one or more but not all of embodiments", unless otherwise specifically emphasized in another manner. The terms "include", "comprise", "have", and their variants all mean "including but not limited to", unless otherwise specifically emphasized in another manner.

In addition, "a plurality of" mentioned in embodiments of this application should be explained as two or more.

Blocks involved in the application classification method provided in embodiments of this application are merely examples. Not all blocks are mandatory, or not all content in each piece of information or each message is mandatory. The blocks or the content may be added or reduced as required in a use process.

In embodiments of this application, a same block or blocks or messages having a same function may be mutually referenced in different embodiments.

A service scenario described in embodiments of this application is intended to describe the technical solutions in embodiments of this application more clearly, and does not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

With development of technologies, a storage capacity of a mobile phone of a user is increasingly large, and APPs in the mobile phone are increasingly abundant. The various APPs can enrich daily life of the user, but also bring many inconveniences to the user in management and use of the APPs. For example, when the user downloads a large quantity of APPs on the mobile phone, an arrangement of icons of the APPs on a desktop of the mobile phone is complex and disorderly, as shown in FIG. 1(a). A plurality of scattered icons of the APPs are arranged on the desktop of the mobile phone shown in FIG. 1(a). Such arrangement of the icons of the APPs is not only inconvenient for the user to search for a required APP, but also consumes time due to a complex search process. This greatly affects efficiency that the user uses the mobile phone.

Based on this, a related technology 1 provides a method for aligning icons of APPs on a display interface of a mobile phone.

Figure 1B:
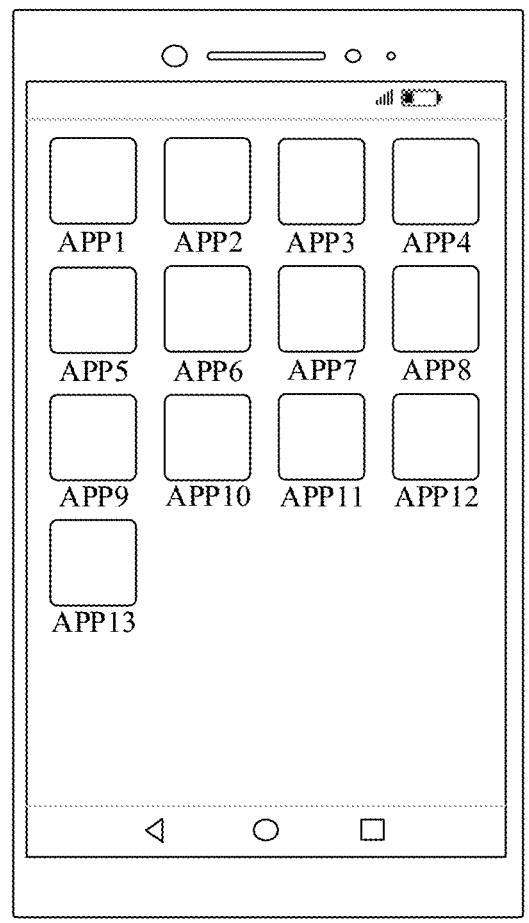

For a scenario shown in FIG. 1(a), the user may apply a touch operation to a "desktop setting" icon on the display interface of the mobile phone, and the mobile phone, in response to the touch operation applied by the user to the "desktop setting" icon, displays several functional controls: a desktop layout, a locked layout, automatic alignment, cyclic sliding, and the like included in the "desktop setting". After the foregoing several functional controls are displayed, the user may apply a touch operation to the "automatic alignment" functional control, and the mobile phone, in response to the touch operation applied by the user to the "automatic alignment" functional control, aligns the icons of the APPs arranged on the display interface of the mobile phone, as shown in FIG. 1(b).

Figure 2A:
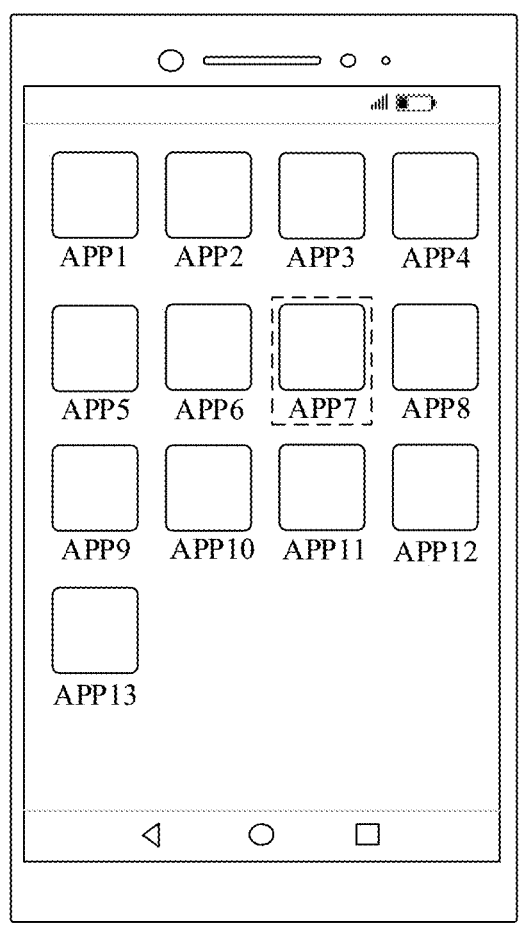
FIG. 2(a) to FIG. 2(c) are a schematic diagram in which a mobile phone automatically aligns icons of APPs after an APP is uninstalled according to a related technology.
Figure 2B:
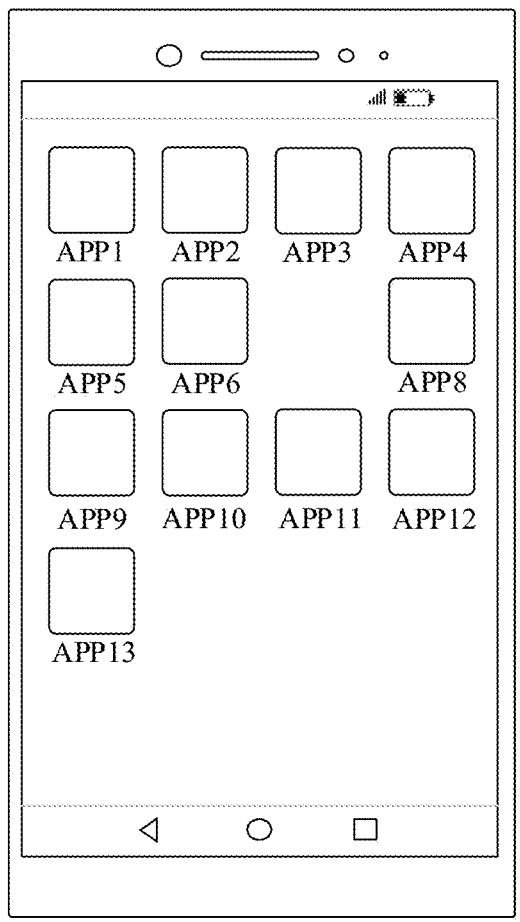
Figure 2C:
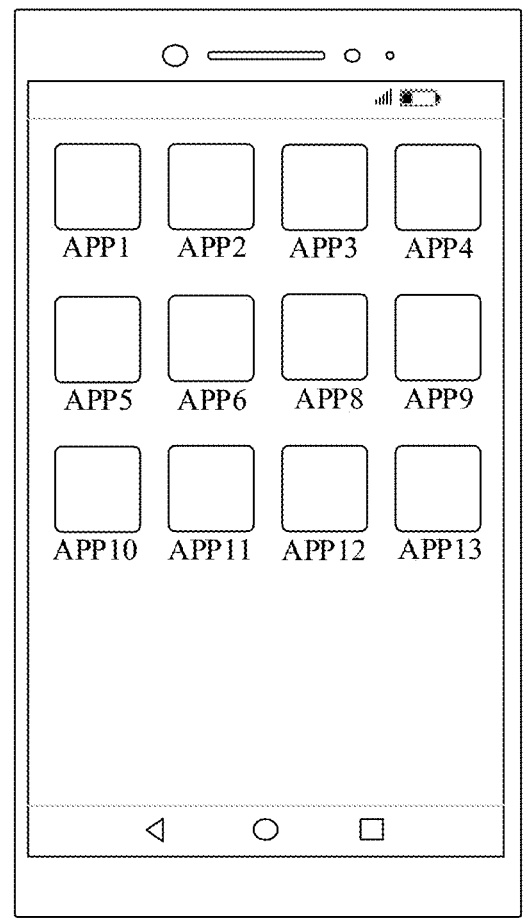

In another scenario, the icons of the APPs on the display interface of the mobile phone are shown in FIG. 2(a), and an icon of each APP corresponds to a position on the display interface of the mobile phone. Positions of an icon of an APP1 to an icon of an APP13 on the display interface of the mobile phone are sequentially arranged from front to back. When the user applies, on the display interface of the mobile phone, a touch operation for uninstalling the APP7 to an icon of the APP7, the mobile phone responds to the touch operation. When an "automatic alignment" function is not enabled on the mobile phone, the mobile phone uninstalls the APP7, deletes the icon of the APP7, and does not move icon of another APP that is behind the icon of the APP7. An obtained layout of the icons of the APPs is shown in FIG. 2(b). When an "automatic alignment" function is enabled on the mobile phone, the mobile phone uninstalls the APP7, deletes the icon of the APP7, and moves an icon of each APP that is behind the icon of the APP7 forward by one position. An obtained layout of the icons of the APPs is shown in FIG. 2(c).

However, in the related technology 1, the icons of the APPs that are originally arranged in a disorderly manner are only simply and automatically aligned. After the icons of the APPs are automatically aligned, the icons of the APPs on the display interface of the mobile phone are still randomly arranged. Therefore, when the user needs to use an APP or a type of APP, the user still needs to search for an icon of a required APP in the icons of the APPs on the display interface of the mobile phone one by one. This affects efficiency that the user uses the mobile phone.

Based on this, a related technology 2 provides a method for classifying and storing an application.

For example, after the user applies a touch operation for creating a folder on the desktop of the mobile phone, the mobile phone responds to the touch operation and creates one or more folders on the display interface. Then, the user applies, to an icon of an APP on the display interface of the mobile phone, a touch operation for moving the icon of the APP to the folder. In response to the touch operation, the mobile phone moves some or all icons of APPs on the display interface of the mobile phone to a corresponding folder.

The user may name each folder to represent a category of the icon of the APP in each folder. For example, a name of the folder may include: a game, a utility tool, learning, food, and the like. When moving the icon of the APP on the display interface of the mobile phone, the user may move the icon of the APP on the display interface of the mobile phone to the corresponding folder based on the name of each folder. In this way, when needing to use an APP or a type of APP, the user may quickly find an icon of a required APP in the corresponding folder based on the name of the folder. This improves efficiency that the user uses the mobile phone.

However, in the related technology 2, the folder is created by the mobile phone based on the touch operation of the user, and moving the icon of the APP on the display interface of the mobile phone to the folder is also completed by the mobile phone based on the touch operation of the user. Therefore, in a process of classifying and storing the icon of the APP in the related technology 2, the user needs to separately apply, to the icon of each APP one by one, a touch operation for moving the icon of the APP to the folder. In addition, a specific folder in which the icon of the APP is classified and stored is also determined by the user, and related information of the APP is not fully utilized. It can be learned from the above that an operation in the process of classifying and storing the icon of the APP is complex, efficiency is low, and a result of classifying and storing may not be accurate enough.

Based on this, an embodiment of this application provides an application classification method, so that an icon of an APP on a display interface of an electronic device is classified and stored, to improve efficiency that a user uses the APP. Specifically, the user applies a first touch operation to a first folder on the display interface of the electronic device. In response to the first touch operation, the electronic device obtains first information of the first folder and a first APP stored in the first folder. One or more second APPs that match the first information are determined from second APPs that are not stored in any folder. The electronic device displays an icon of the one or more second APPs around the first folder. Then, the user may apply a second touch operation to an icon of a target APP in the icon of the one or more second APPs. The electronic device stores the icon of the target APP in the first folder in response to the second touch operation.

The first information can reflect related information about the first folder and the first APP, and the second APP that matches the first information is an APP that is related to the first folder. After the electronic device displays, around the first folder, an icon of an APP that matches the first folder, the user only needs to select an APP that the user wants to store in the first folder, so that the APP having a high degree of matching the first file can be stored in the first folder. In this way, it is convenient for the user to operate. In addition, when the second touch operation of the user is added, a fault tolerance rate of an APP classification algorithm is also high.

The application classification method provided in this embodiment of this application may be applied to an electronic device such as a mobile phone, a personal digital assistant (PDA), a tablet computer, a portable device (for example, a portable computer), a personal computer (PC), and a wearable device. A specific type of the electronic device is not limited in this embodiment of this application.

FIG. 3(a) to FIG. 3(d) are a schematic diagram of an application scenario of an application classification method according to an embodiment of this application.

Figure 3A:
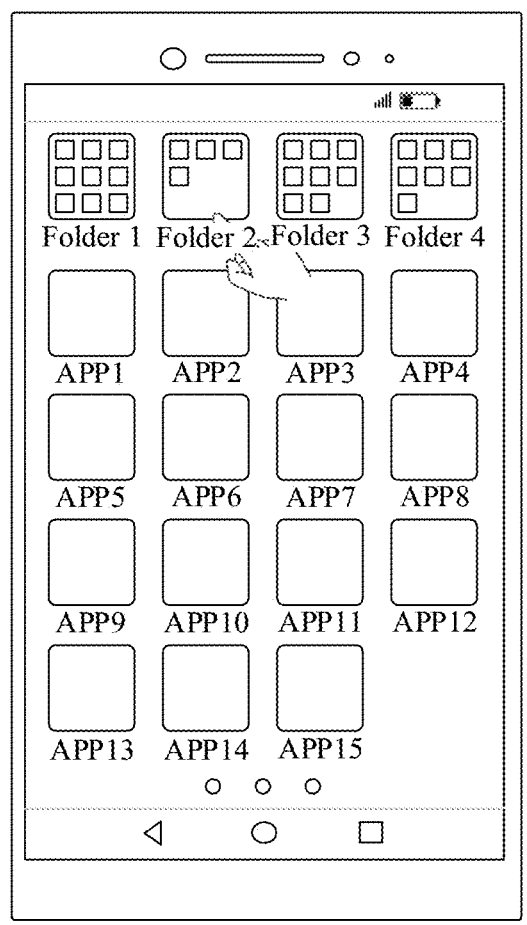
FIG. 3(a) to FIG. 3(d) are a schematic diagram of application scenarios of an application classification method according to an embodiment of this application.
Figure 3B:
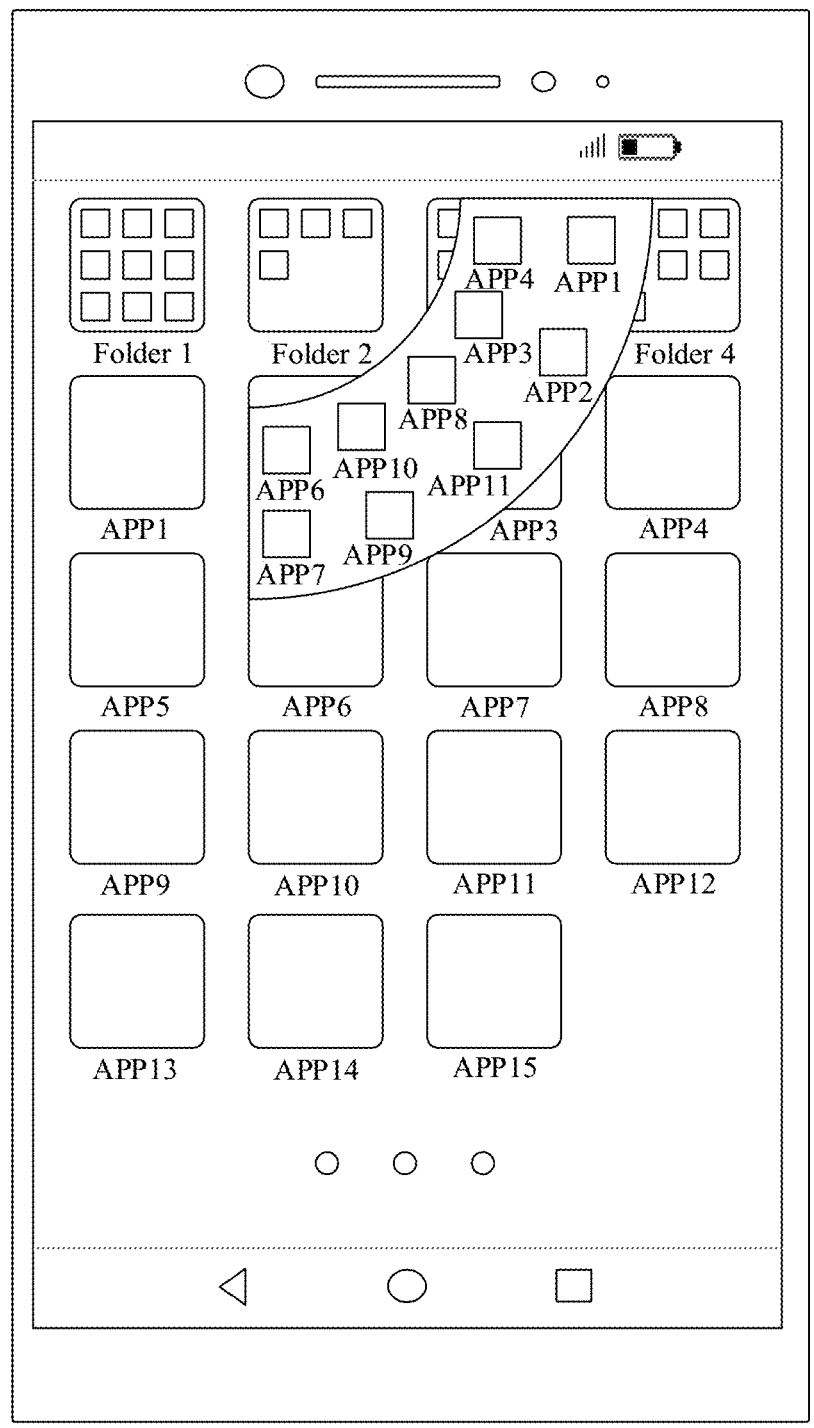

Refer to FIG. 3(a). Icons of a folder 1 to a folder 4 and icons of an APP1 to an APP15 are arranged on a display interface of an electronic device. A user may apply a first touch operation whose touch duration is greater than preset time on the folder 2. In response to the first touch operation, the electronic device displays an interface shown in FIG. 3(b). In the interface shown in FIG. 3(b), icons of a plurality of APPs matching the folder 2 are displayed around the folder 2, for example, an icon of the APP4, an icon of the APP3, an icon of the APP8, an icon of the APP10, an icon of the APP6, an icon of the APP1, an icon of the APP2, an icon of the APP11, an icon of the APP9, and an icon of the APP7. The icons of the plurality of APPs may be arranged around the folder 2 in a sector-shaped area, and an APP that is close to the folder 2 has a high degree of matching an APP in the folder 2. As shown in FIG. 3(b), the APP4, the APP3, the APP8, the APP10, and the APP6 are close to the folder 2, and therefore, the APP4, the APP3, the APP8, the APP10, and the APP6 have high degrees of matching the APP in the folder 2. The APP1, the APP2, the APP11, the APP9, and the APP7 are far away from the folder 2, and therefore, the APP4, the APP3, the APP8, the APP10, and the APP6 have low degrees of matching the APP in the folder 2.

Figure 3C:
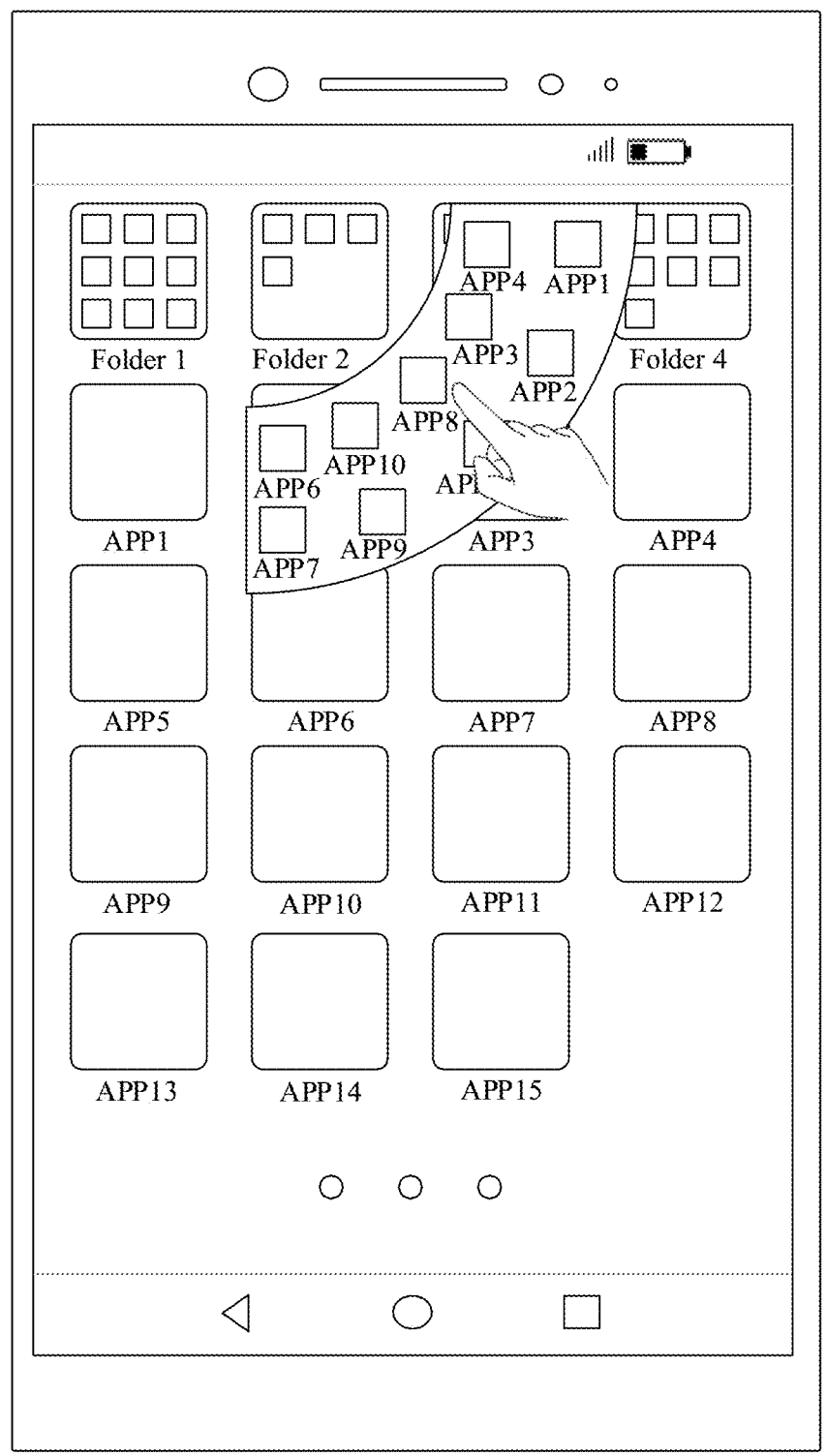
Figure 3D:
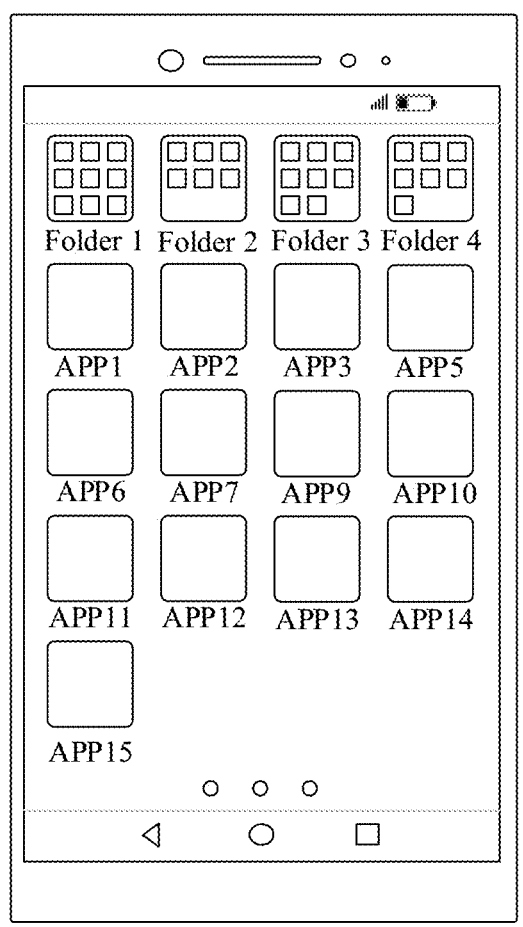

The user may tap an icon of an APP in the sector-shaped area. For example, the user taps the icon of the APP8, as shown in FIG. 3(c). After detecting that the user taps an icon of an APP in the sector-shaped area, the electronic device stores the icon of the APP in the folder 2, and deletes the icon of the APP from the display interface of the electronic device. For example, after detecting that the user taps the icon of the APP8 and the icon of the APP4 in the sector-shaped area, the electronic device stores the icon of the APP8 and the icon of the APP4 in the folder 2, and deletes the icon of the APP8 and the icon of the APP4 from the display interface of the electronic device, as shown in FIG. 3(d).

Figure 4:
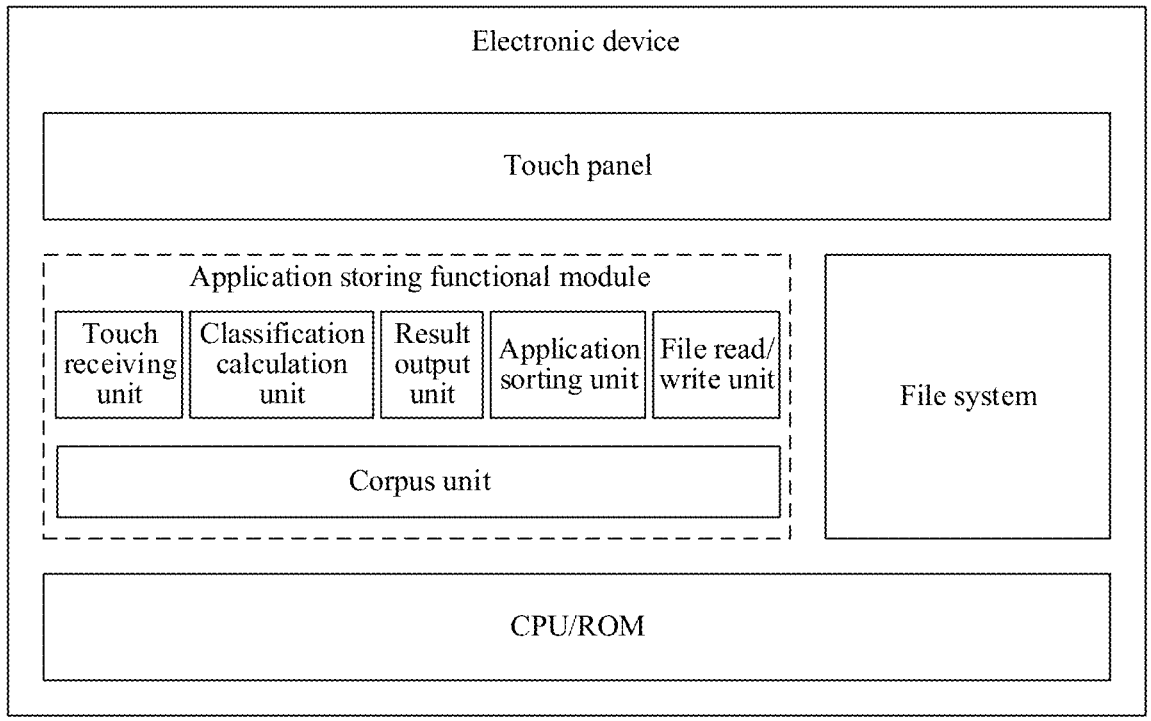
FIG. 4 is a schematic diagram of an architecture of an electronic device according to an embodiment of this application.

FIG. 4 is a schematic diagram of an architecture of an electronic device according to an embodiment of this application. Refer to FIG. 4. The electronic device may include an application storing functional module. The application storing functional module includes a touch receiving unit, a classification calculation unit, a result output unit, an application sorting unit, a file read/write unit, and a corpus unit.

Specifically, the touch receiving unit is configured to receive touch information corresponding to a touch operation applied by a user on a touch panel of the electronic device. The touch information mainly includes two parts. A first part is that after the user applies a touch operation that exceeds preset time (for example, 3 seconds) to a first folder on the touch panel, a user behavior corresponding to the touch operation is determined to be an action of storing an APP that is not included in a folder. A second part is information about an APP that the user needs to store.

The classification calculation unit is configured to calculate a similarity degree between all APPs that are not included in the folder and the first folder by using a module, for example, a central processing unit (CPU)/read-only memory (ROM) of the electronic device. The classification calculation unit may determine, based on information such as an application label, use duration, and a usage frequency of an APP, a degree of matching between the APP that is not included in the folder and the first folder by using a machine learning algorithm.

The foregoing machine learning algorithm includes a naive Bayes algorithm, an association analysis algorithm, and a term frequency-inverse document frequency (TF-IDF) statistical method. In this embodiment of this application, a probability that the APP that is not included in the folder may be stored in the first folder may be predicted based on the naive Bayes algorithm. Alternatively, an association degree between each APP that is not included in the folder and the first folder may be calculated based on the association analysis algorithm. Alternatively, the degree of matching between each APP that is not included in the folder and the first folder may be calculated based on the TF-IDF statistical method.

The file read/write unit is configured to read and write, in a file system of the electronic device, information about a target folder, information about the first folder, information about a first APP in the first folder, and information about all the APPs that are not stored in the file. The information about the first folder includes information such as a category name, a description, and a creation time point of the first folder. The information about the first APP and the information about all the APPs that are not stored in the file may respectively include information such as a name, a label, and a creation time point of the APP. The label of the APP may be label information for representing usage, a category, a function, and the like of the APP. For example, for a chat APP, a label of the chat APP may include social communication, a friend circle, social networking, an emoticon, a voice, a QR code, scanning, and the like.

Figure 5:
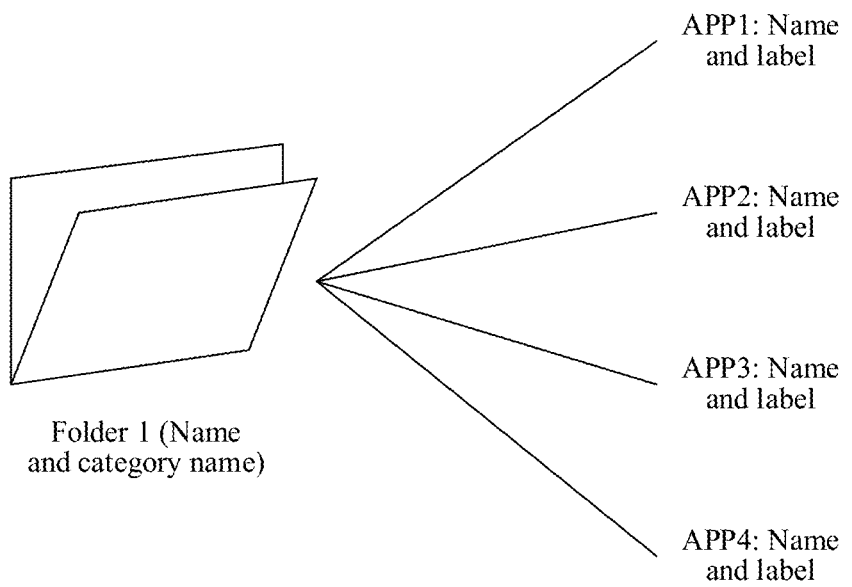
FIG. 5 is a schematic diagram of a relationship between a folder and an APP according to an embodiment of this application.

For example, a relationship between the folder and the APP may include: The folder includes an APP, and the folder does not include an APP. As shown in FIG. 5, a folder 1 includes an APP1 to an APP4, and each of the APP1 to the APP4 has a corresponding name and label. Therefore, the folder 1 has an inclusion relationship with the APP1 to the APP4.

The corpus unit is configured to: crawl information about an APP (for example, crawl the information about the APP from a mobile phone application store), obtain a name of the APP and a category to which the APP belongs, establish a corpus based on the name of the APP, perform word segmentation on the name of the APP in the corpus, and calculate an importance degree of a word segmentation object in the category. For example, the importance degree of the word segmentation object in the category may be calculated based on a quantity of times that a keyword obtained through word segmentation appears.

The application sorting unit is configured to sort each APP in the target folder based on a download time point and a usage frequency of the APP in the target folder after storing in the target folder is completed.

The result output unit is configured to re-sort and display an icon of the APP in the target folder and an icon of an APP and an icon of a folder that are on a display interface after storing in the target folder is completed and each APP in the target folder is sorted.

The following describes in detail the application classification method provided in embodiments of this application.

Figure 6:
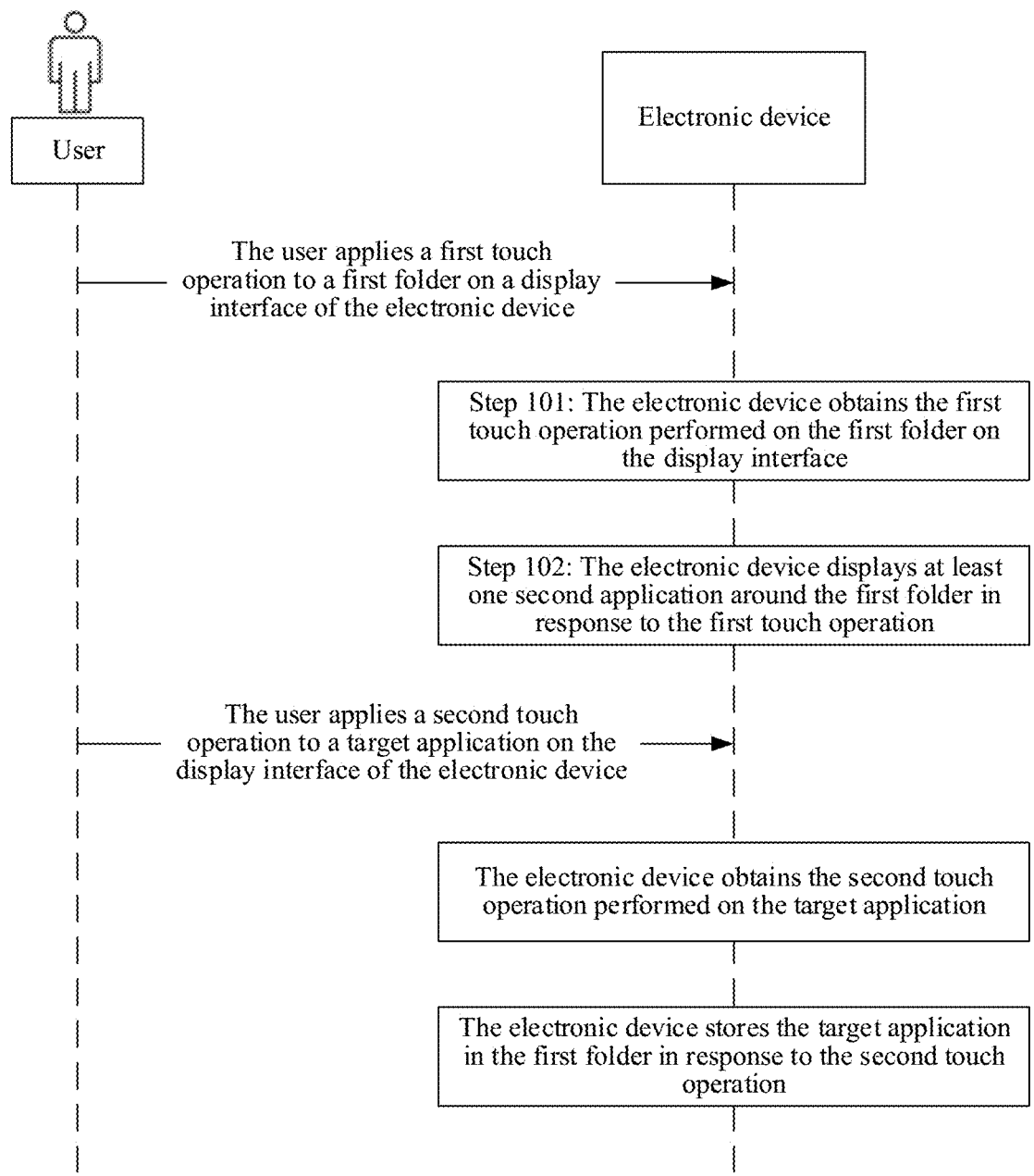
FIG. 6 is a schematic flowchart of an application classification method according to an embodiment of this application.

FIG. 6 is a schematic flowchart of an application classification method according to an embodiment of this application. Refer to FIG. 6. The application classification method may include the following blocks.

Block 101: An electronic device obtains a first touch operation performed on a first folder on a display interface.

The first folder is any folder on the display interface of the electronic device, and the first folder includes at least one first application. For example, the display interface of the electronic device may display a plurality of third applications and a plurality of folders, and the plurality of third applications are not included in any one of the plurality of folders.

In some embodiments, the first touch operation may be a touch operation that is performed on the first folder and meets a preset condition. For example, the first touch operation may be a touch operation that is performed on the first folder and whose touch duration is greater than preset time. For another example, the first touch operation may be a touch operation that is performed on the first folder and whose quantity of touch points meets a preset quantity requirement. For another example, the first touch operation may be a touch operation that is performed on the first folder and whose sliding track meets a preset track.

In some embodiments, the first touch operation may be applying a touch operation to the first folder and simultaneously pressing a first button. The first button may be one or more physical buttons in the electronic device, or one or more virtual buttons on the display interface of the electronic device.

Block 102: The electronic device displays at least one second application around the first folder in response to the first touch operation.

The at least one second application is an application that is in the third application and whose degree of matching the first folder is greater than a threshold.

For example, the electronic device may determine a degree of matching between each third application and the first folder based on information such as a category and a label of each third application. Then, the electronic device displays, around the first folder, a third application whose matching degree is greater than the threshold.

The "matching degree" in this embodiment of this application may be understood as a similarity between the third application and the first application in the first folder. For example, if the third application is a movie and television application, and the first application in the first folder is a movie and television application, the degree of matching between the third application and the first folder is high. If the third application is a movie and television application, and the first application in the first folder is an education application, the degree of matching between the third application and the first folder is low.

In some embodiments, the electronic device may crawl the information such as the category and the label of the third application from an application store. Then, the electronic device performs word segmentation processing on the information such as the category and the label of the third application. The electronic device calculates the degree of matching between each third application and the first folder by using a preset algorithm based on a word segmentation processing result. The preset algorithm may be one or more of a naive Bayes algorithm, an association analysis algorithm, and a term frequency-inverse document frequency (TF-IDF) algorithm. For a specific process of the foregoing algorithm, refer to subsequent related descriptions, which are not described herein.

In the foregoing application classification method, the electronic device obtains the first touch operation performed on the first folder on the display interface. Then, the electronic device displays the at least one second application around the first folder in response to the first touch operation. The at least one second application is the application that is in the third application (an application that is not included in any folder on the display interface of the electronic device) and whose degree of matching the first folder is greater than the threshold. An application that matches the first folder is displayed around the first folder, so that a user can quickly select an application that the user wants to store in the first folder. In this way, an application that is not stored in any folder is classified, thereby improving efficiency that the user manages and uses the application.

In an embodiment, refer to FIG. 6. The foregoing method may further include the following blocks.

The electronic device obtains a second touch operation performed on a target application, where the target application is any application in the at least one second application.

The electronic device stores the target application in the first folder in response to the second touch operation.

The second touch operation may be a tap operation. For example, the user may choose to apply a tap operation to one or more of the applications displayed around the first folder. Then, in response to the tap operation, the electronic device stores an application corresponding to the tap operation in the first folder.

In this embodiment of this application, the application that has a high degree of matching the first folder may be determined by using the preset algorithm. Then, the user may select, from the applications displayed around the first folder, the target application that the user wants to store in the first folder. In this embodiment of this application, after the degree of matching between the third application and the first folder is determined by using the preset algorithm, the target application is selected through a user operation to be stored in the first folder. This combines the algorithm and the user operation, so that a fault tolerance rate of the preset algorithm can be improved.

Figure 7:
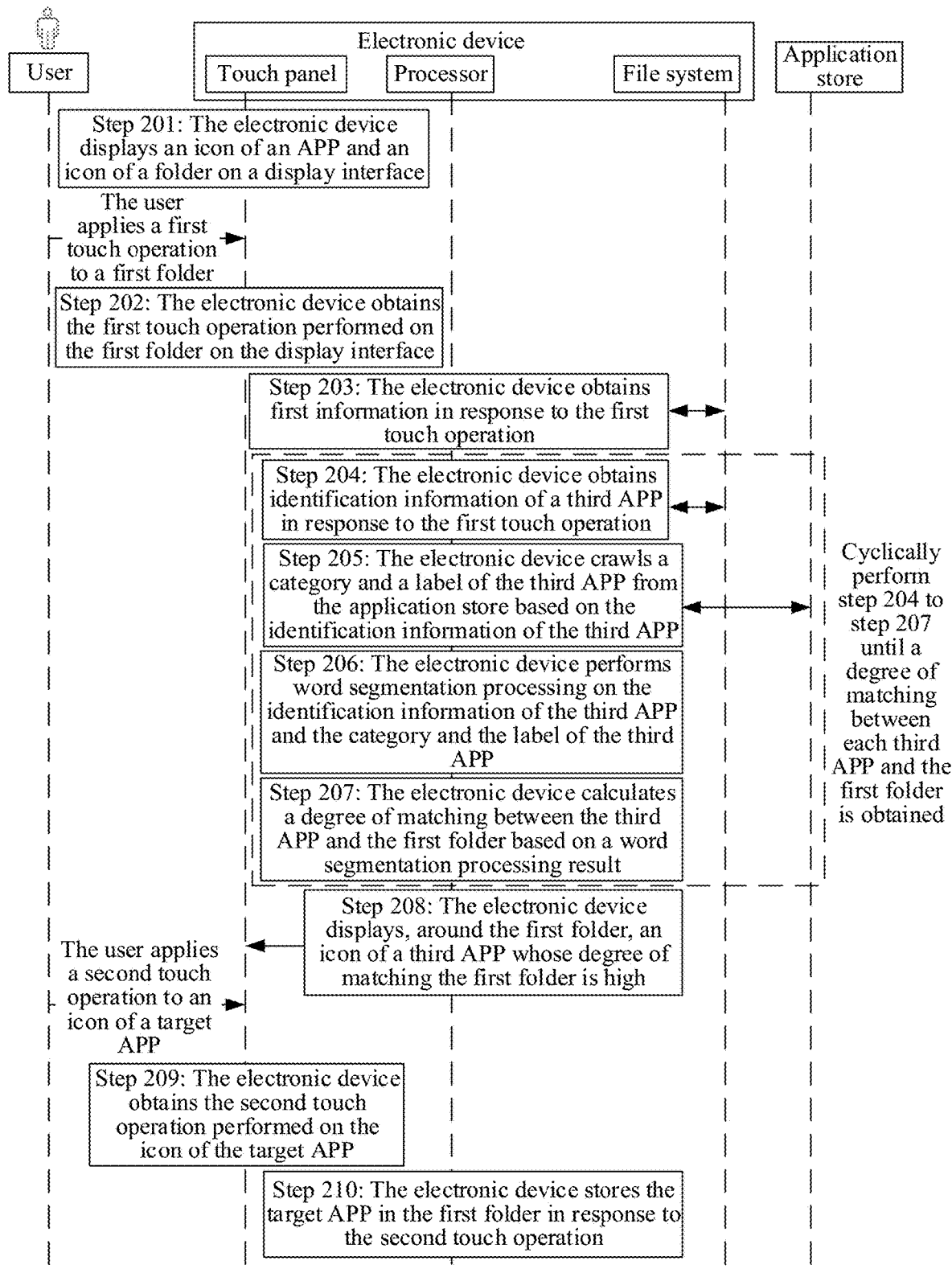
FIG. 7 is a schematic flowchart of an application classification method according to an embodiment of this application.

FIG. 7 is a schematic flowchart of an application classification method according to an embodiment of this application. Refer to FIG. 7. The application classification method may include the following blocks.

Block 201: An electronic device displays an icon of an APP and an icon of a folder on a display interface.

The following describes this embodiment of this application by using an example in which the electronic device is a mobile phone.

As shown in FIG. 8(*a*), the mobile phone displays icons of a folder 1 to a folder 4 and icons of an APP1 to an APP15 on the top of the display interface. The APP1 to the APP15 are APPs that are not stored in the folder. Each of the folder 1 to the folder 4 has a corresponding folder name, and an APP included in each folder is an APP of a same category. For example, the category of the APP may include audio and video entertainment, a utility tool, social communication, education, food, news reading, travel navigation, travel accommodation, and the like.

In a scenario, the name of the folder 1 may be the audio and video entertainment, the name of the folder 2 may be the social communication, the name of the folder 3 may be the news reading, and the name of the folder 4 may be the utility tool. Correspondingly, a category of an APP included in the folder 1 is the audio and video entertainment. To be specific, all APPs included in the folder 1 are APPs related to the audio and video entertainment. A category of an APP included in the folder 2 is the social communication. To be specific, all APPs included in the folder 2 are APPs related to the social communication. A category of an APP included in the folder 3 is the news reading. To be specific, all APPs included in the folder 3 are APPs related to the news reading. A category of an APP included in the folder 4 is the utility tool. To be specific, all APPs included in the folder 4 are APPs related to the utility tool.

Block 202: The electronic device obtains a first touch operation performed on a first folder on the display interface.

The first folder may be any folder on the display interface, and the first touch operation may be a touch operation that triggers the electronic device to classify an APP that is not stored in a folder on the display interface.

For example, the electronic device may obtain the first touch operation through a touch panel.

In some embodiments, the first touch operation may be a touch operation that is performed on the first folder and whose touch duration is greater than preset time. For example, the preset time may be 3 seconds.

In an application scenario, after an interface shown in FIG. 8(*a*) is displayed on the display interface of the mobile phone, a user may apply a touch operation whose touch duration is greater than 3 seconds to the first folder on the interface. After the interface shown in FIG. 8(*a*) is displayed on the display interface of the mobile phone, the user may apply the touch operation whose touch duration is greater than 3 seconds to the folder 2, as shown in FIG. 8(*b*).

In some embodiments, the first touch operation may be a touch operation that is performed on the first folder and whose quantity of touch points meets a preset quantity requirement. For example, the preset quantity requirement may be that the quantity of touch points is 2.

In an application scenario, after an interface shown in FIG. 8(*a*) is displayed on the display interface of the mobile phone, a user may apply a touch operation whose quantity of touch points is 2 to the first folder on the interface. For example, after the interface shown in FIG. 8(*a*) is displayed on the display interface of the mobile phone, the user may apply the touch operation whose quantity of touch points is 2 to the folder 2 on the interface in FIG. 8(*a*) by using two fingers.

In some embodiments, the first touch operation may be a touch operation that is performed on the first folder and whose sliding track meets a preset track. For example, after an interface shown in FIG. 8(*a*) is displayed on the display interface of the mobile phone, a user may apply a touch operation to the folder 2 on the interface, and a sliding track of the touch operation meets the preset track. The preset track may be set based on an actual situation.

In some embodiments, the first touch operation may be applying a touch operation to the first folder and simultaneously pressing a first button. The first button is one or more physical buttons in the electronic device, or one or more virtual buttons on the display interface of the electronic device. For example, after an interface shown in FIG. 8(*a*) is displayed on the display interface of the mobile phone, a user may apply a touch operation to the folder 2 on the interface, and simultaneously apply a press operation to a physical button of the electronic device.

Block 203: The electronic device obtains first information in response to the first touch operation.

The first information includes information about the first folder and information about a first APP, where the first APP is an APP included in the first folder. In an embodiment, the information about the first folder may be information that can represent a category of the first folder, and the information about the first APP may be information that can represent a category and a label of the first APP. For example, the information about the first APP may include information such as a name, the category, the label, and a creation time point of the first APP, and the information about the first folder may include information such as a name, a description, and a creation time point of the first folder.

In some embodiments, the electronic device may obtain the first information by using a file system. For example, the electronic device obtains the name of the first folder, and searches the file system of the electronic device for the information about the first folder and the information about the first APP based on the name of the first folder.

For example, the electronic device may search the file system of the electronic device for manifest information of the first APP in the first folder based on the name of the first folder, and obtain the name and the creation time point of the first APP from the manifest information. The electronic device may obtain the category and the label of the first APP from an application store through crawling based on the name of the first APP, and store the category and the label of the first APP in a corpus of the electronic device. In block 203, the electronic device may directly obtain the category and the label of the first APP from the corpus of the electronic device based on the name of the first APP.

In some embodiments, the information about the first folder and the information about the first APP may be stored in the corpus of the electronic device. The corpus may be located in the file system of the electronic device. The electronic device may search the corpus for the information about the first folder and the information about the first APP based on the name of the first folder.

Block 204: The electronic device obtains identification information of a third APP in response to the first touch operation.

Figure 8A:
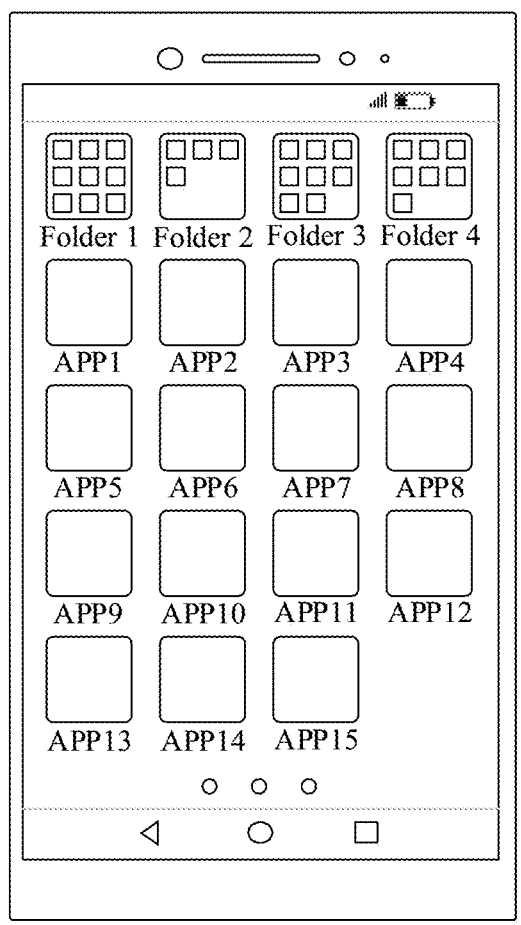
FIG. 8(a) to FIG. 8(e) are a schematic diagram of display interfaces of an electronic device according to an embodiment of this application.
Figure 8B:
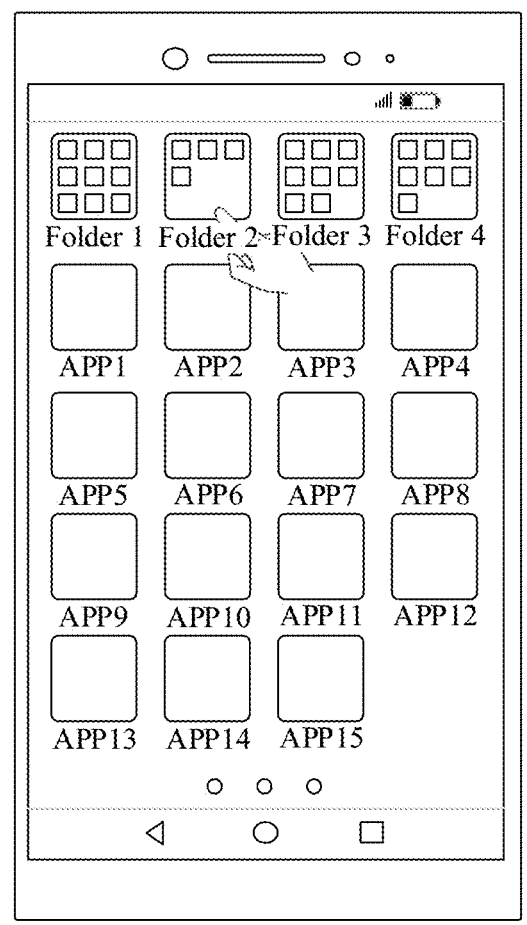

The third APP is an APP that is not included in any folder. For example, the APP1 to the APP15 shown in FIG. 8(a) are the APPs that are not included in any folder (the folder 1 to the folder 4).

In some embodiments, the electronic device may obtain the identification information of the third APP by using the file system of the electronic device. For example, the electronic device may search the file system of the electronic device for manifest information of the third APP, where the manifest information may be used as the identification information of the third APP. The manifest information of the third APP includes a name of the third APP.

Block 205: The electronic device crawls a category and a label of the third APP from the application store based on the identification information of the third APP.

In some embodiments, the electronic device may crawl the category and the label of the third APP from the application store based on the name of the third APP.

Figure 9A:
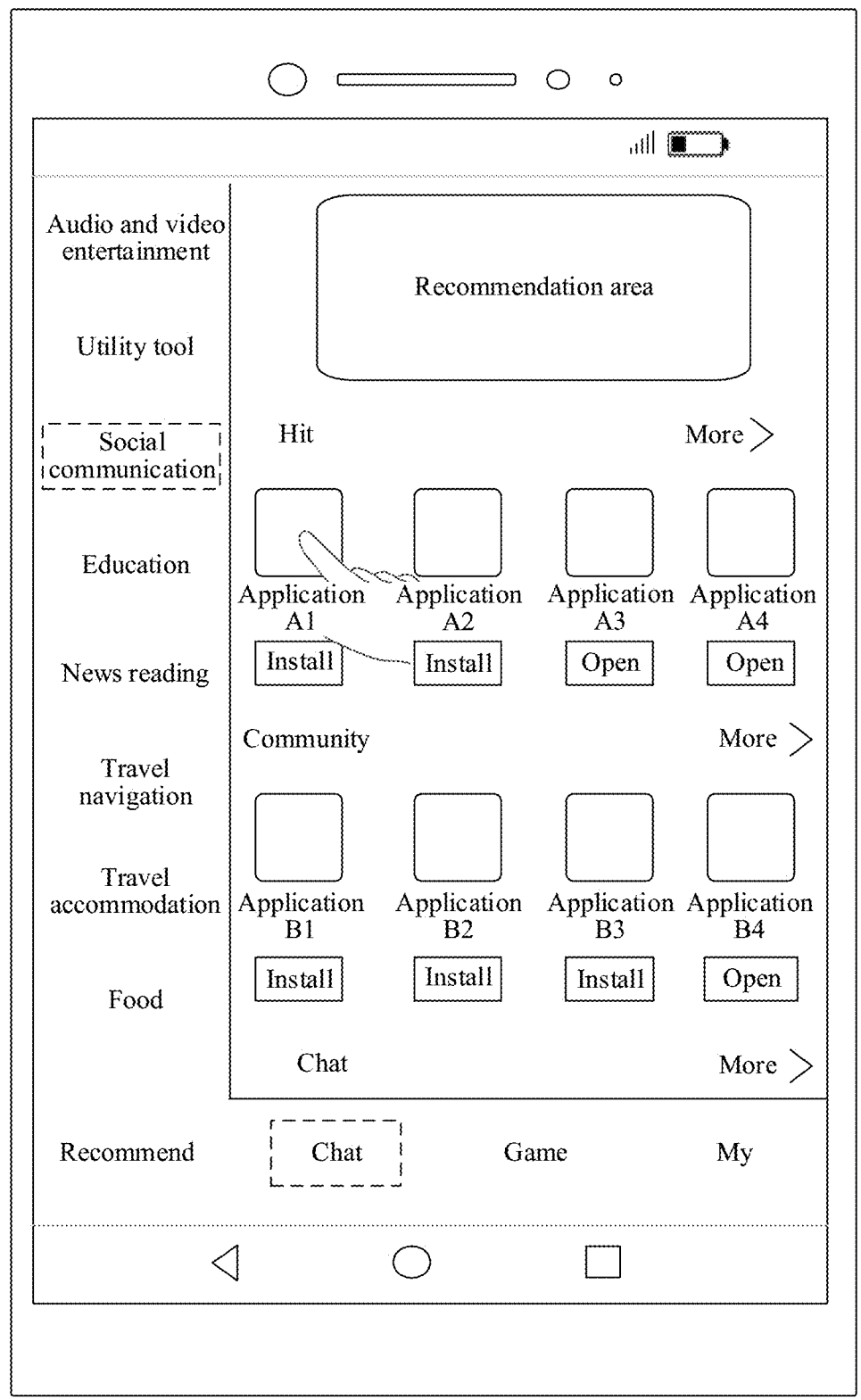
FIG. 9(a) and FIG. 9(b) are a schematic diagram of interfaces of an application store according to an embodiment of this application.
Figure 9B:
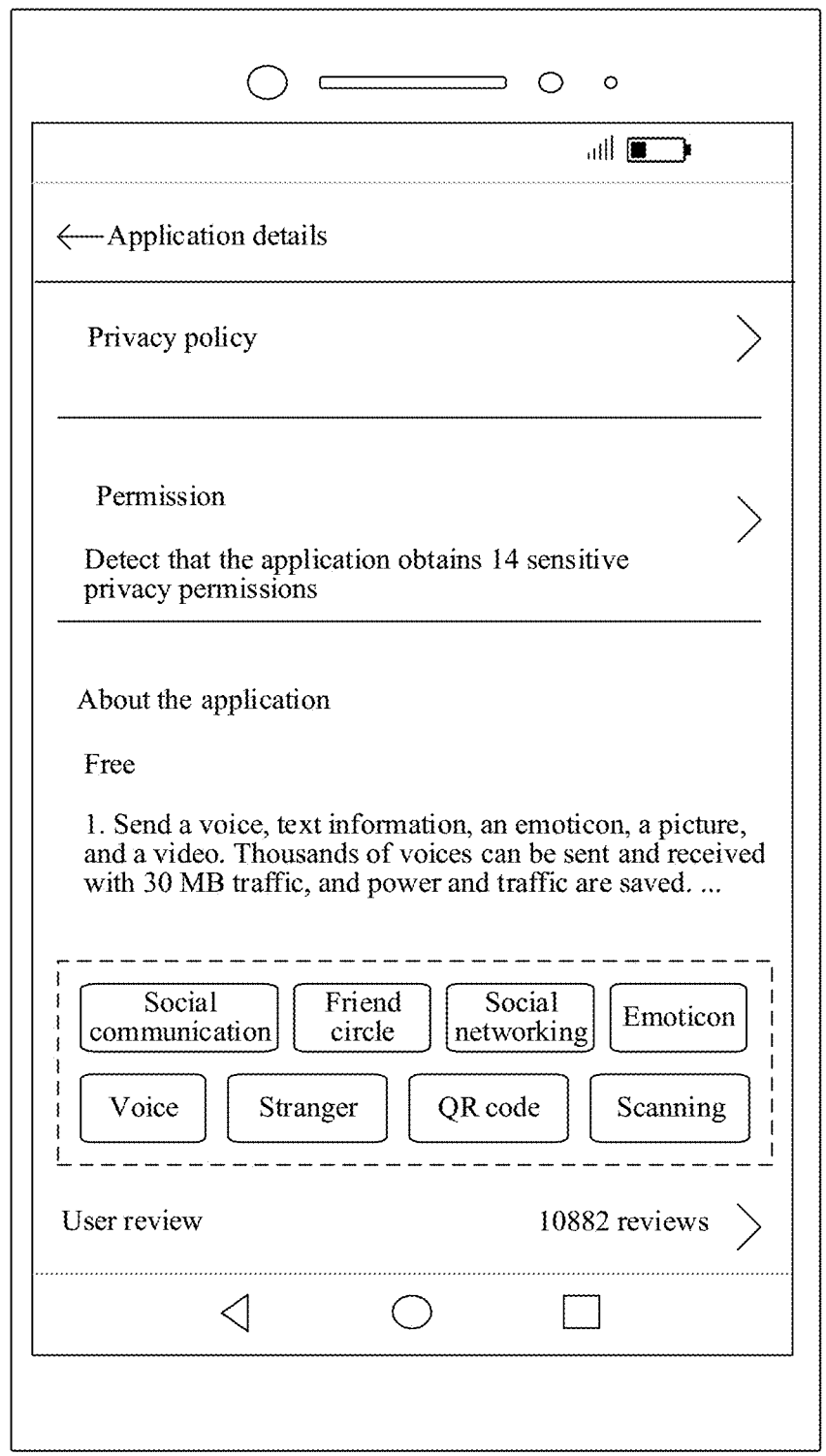

In some scenarios, for an application A1, the electronic device may crawl from the application store to find that a category of the application A1 is the "social communication", as shown in FIG. 9(a). The electronic device may crawl from the application store to find that a label of the application A1 is: the "social communication", a "friend circle", "social networking", an "emoticon", a "voice", a "stranger", a "QR code", "scanning", and the like, as shown in FIG. 9(b).

Block 206: The electronic device performs word segmentation processing on the identification information of the third APP and the category and the label of the third APP.

The electronic device may perform word segmentation processing on the identification information of the third APP and the category and the label of the third APP based on a preset word segmentation algorithm, to obtain a word segmentation processing result.

For example, the word segmentation processing result may be a keyword that represents the category and the label of the third APP. For example, for the application A1, the word segmentation processing result may include: the social communication, the friend circle, the social networking, the emoticon, and the like.

Block 207: The electronic device calculates a degree of matching between the third APP and the first folder based on the word segmentation processing result.

The electronic device may calculate the degree of matching between the third APP and the first folder based on the word segmentation processing result, the information about the first folder, and the information about the first APP. Both the information about the first folder and the information about the first APP may correspond to a plurality of keywords.

In some possible implementations, the electronic device may compare a plurality of first keywords in the word segmentation processing result with a plurality of second keywords in the information about the first folder and the information about the first APP, to determine a quantity of same or similar keywords in the plurality of first keywords and the plurality of second keywords. Then, the electronic device may determine the degree of matching between the third APP and the first folder based on the foregoing quantity.

For example, an application 1 corresponds to keywords $a_1, a_2, \ldots,$ and $a_m$, and an application 2 corresponds to keywords $b_1, b_2, \ldots,$ and $b_n$. If a quantity of keywords that are similar to or the same as the second keyword and that are in the keywords $a_1, a_2, \ldots,$ and $a_m$ is $x_1$, a quantity of keywords that are similar to or the same as the second keyword and that are in the keywords $b_1, b_2, \ldots,$ and $b_n$ is $x_2$, and $x_1 > x_2$, a degree of matching between the application 1 and the first folder is greater than a degree of matching between the application 2 and the first folder.

In some possible implementations, the electronic device may calculate the degree of matching between the third APP and the first folder based on any one of a naive Bayes algorithm, an association analysis algorithm, and a TF-IDF statistical method. The following describes in detail calculating by the electronic device based on the naive Bayes algorithm, the association analysis algorithm, and the TF-IDF statistical method.

In this embodiment of this application, the electronic device cyclically performs block 204 to block 207, to obtain a degree of matching between each third APP and the first folder through calculation, until the degree of matching between each third APP and the first folder is obtained.

Block 208: The electronic device displays, around the first folder, an icon of a third APP whose degree of matching the first folder is high.

In some embodiments, the electronic device may determine N third APPs that have a highest degree of matching the first folder as second APPs, where there are N second APPs. Icons of the N second APPs are displayed around the first folder, so that the user selects an APP that needs to be stored in the first folder. N may be set based on an actual situation. For example, N is 10.

In some embodiments, the electronic device may sort the icons of the N second APPs based on matching degrees, and display the icons around the first folder. For example, the electronic device may display the icons of the N second APPs around the first folder in descending order of the degrees of matching the first folder, so that the user selects an APP that needs to be stored in the first folder.

In some embodiments, the electronic device may display, around the first folder in a preset arrangement manner, an icon of a second APP that has a high degree of matching the first folder, so that the user selects an APP that needs to be stored in the first folder.

Figure 8C:
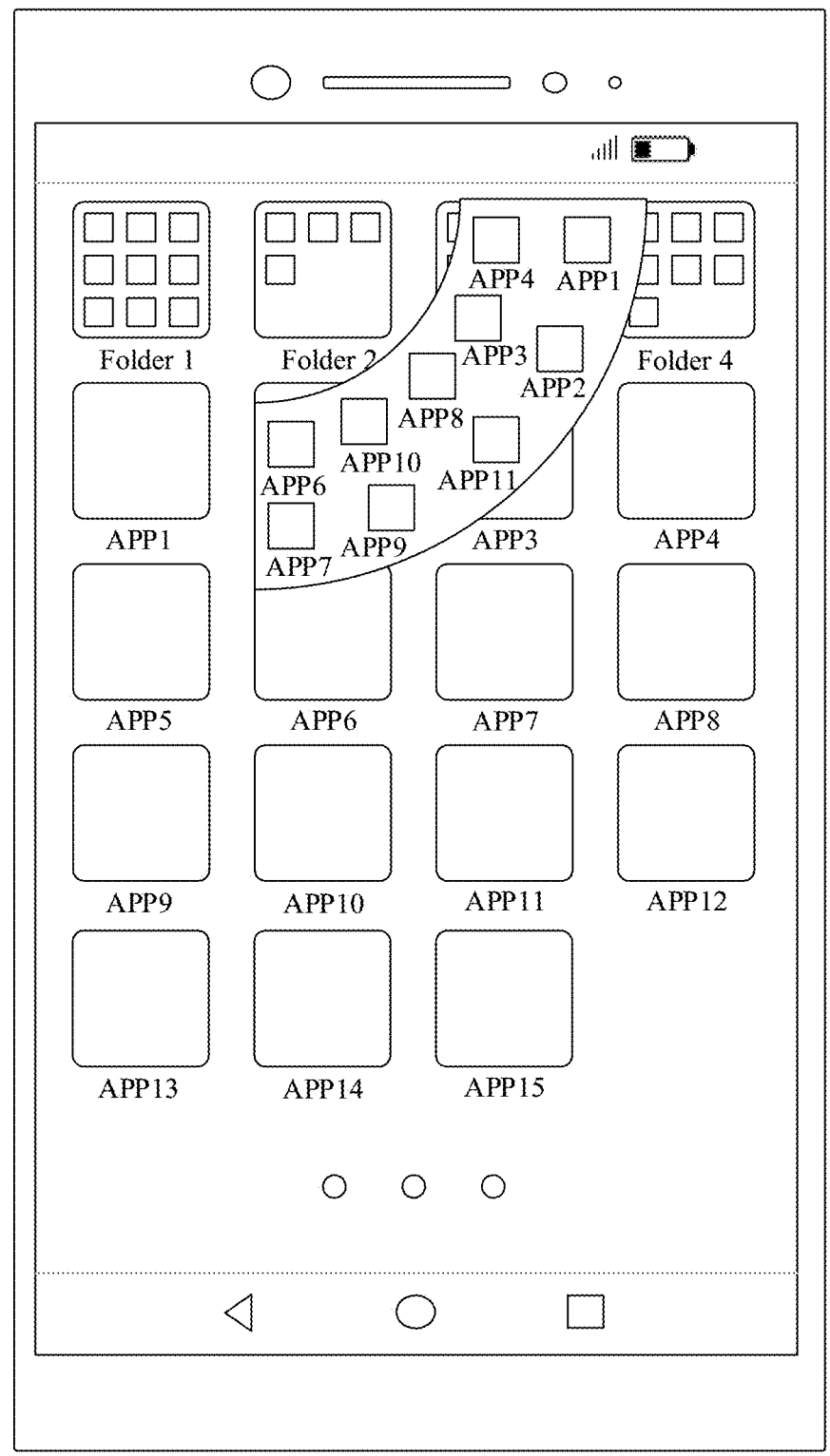
Figure 8D:
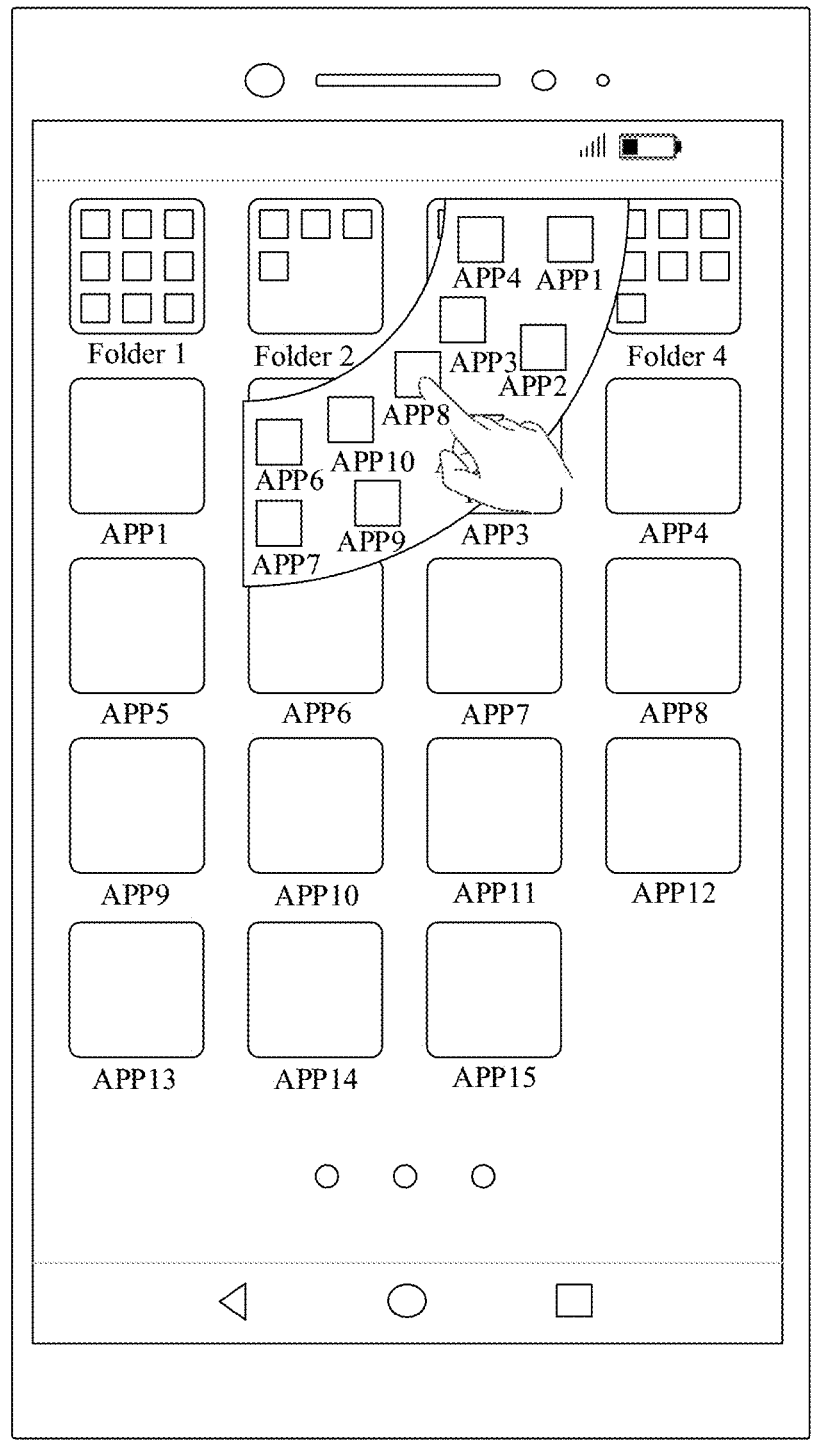
Figure 8E:
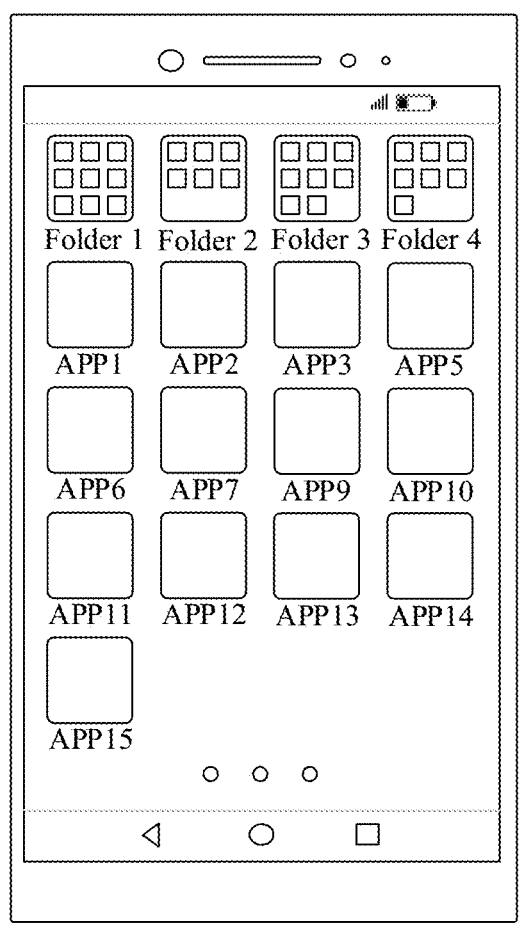

In some scenarios, as shown in FIG. 8(c), the APP1, the APP2, the APP3, the APP4, the APP5, the APP6, the APP7, the APP9, the APP10, and the APP11 are 10 second APPs that have highest degrees of matching the first folder. The electronic device sorts the 10 second APPs in descending order of the degrees of matching the first folder, to obtain the APP4, the APP3, the APP8, the APP10, the APP6, the APP1, the APP2, the APP11, the APP9, and the APP7. Then, the electronic device displays the icons of the 10 second APPs around the first folder in a sector-shaped manner (as shown in FIG. 8(c)), so that the user selects the APP that needs to be stored in the first folder.

As shown in FIG. 8(c), the APP4, the APP3, the APP8, the APP10, the APP6, the APP1, the APP2, the APP11, the APP9, and the APP7 are distributed as first-layer applications and second-layer applications. Specifically, the APP4, the APP3, the APP8, the APP10, and the APP6 are the first-layer applications, and the APP1, the APP2, the APP11, the APP9, and the APP7 are the second-layer applications. Each of the first-layer application and the second-layer application includes at least one application. In addition, the first-layer application is close to the first folder relative to the second-layer application.

It should be noted that the electronic device displays, around the first folder in the sector-shaped manner, the icon of the second APP that has the high degree of matching the first folder, which is merely an example for description. This embodiment of this application is not limited thereto. For example, the electronic device may further display, around the first folder in a manner of any other shape, the icon of the second APP that has the high degree of matching the first folder.

Block 209: The electronic device obtains a second touch operation performed on an icon of a target APP.

The target APP may be one or more APPs in the second APP that has the high degree of matching the first folder in block 208.

In a scenario, after an interface shown in FIG. 8(*c*) is displayed in the electronic device, the user may select the target APP from 10 APPs by referring to the 10 APPs displayed around the folder 2, and apply the second touch operation to the icon of the target APP, so that the electronic device stores the target APP in the folder 2.

For example, as shown in FIG. 8(*d*), the user may refer to degrees of matching between the 10 APPs and the folder 2, and apply the second touch operation to icons of the APP8 and the APP4 whose matching degrees are high. The electronic device obtains the second touch operation performed on the icon of the APP8 and the icon of the APP4.

The second touch operation may be a tap operation. For example, the user separately applies a tap operation to the icons of the APP8 and the APP4 whose matching degrees are high.

Block 210: The electronic device stores the target APP in the first folder in response to the second touch operation.

After the electronic device obtains the second touch operation performed on the icon of the target APP, the electronic device stores the target APP in the first folder in response to the second touch operation.

In a scenario, after obtaining the second touch operation performed on the icon of the APP8 and the icon of the APP4, the electronic device stores the APP8 and the APP4 in the folder 2, and deletes the icon of the APP8 and the icon of the APP4 from the display interface, as shown in FIG. 8(*e*).

In some embodiments, after the electronic device stores the target APP in the first folder, the electronic device may write information about the target APP into the corpus, to update the corpus.

In some embodiments, after the electronic device stores the target APP in the first folder, the electronic device may modify a relationship between the target APP and the first folder in the file system to that the first folder includes the target APP.

In some embodiments, after the electronic device stores the target APP in the first folder, the electronic device may sort an APP in the first folder. For example, the electronic device may sort each APP in the first folder based on a quantity of use times and/or a download time point of the APP. The quantity of use times of the APP may be a quantity of use times of the APP in an electronic device, or may be a sum of quantities of use times of the APP in a plurality of electronic devices. The download time point of the APP may be a time point at which the APP is installed in the electronic device. The electronic device may, by sorting the APP in the first folder, set an icon of an APP that is commonly used by the user at a front position in the first folder, so that it is more convenient for the user to select an APP that needs to be used.

The following describes in detail several methods that the electronic device calculates the degree of matching between the third APP and the first folder.

1. The electronic device calculates the degree of matching between the third APP and the first folder based on the naive Bayes algorithm.

It is assumed that a to-be-classified third APP is an $APP_y$, the first folder to which the user applies the first touch operation is a folder_i, and the first folder includes p APPs, which are respectively $x_1, x_2, \ldots,$ y=1 indicates that the $APP_y$ belongs to the first folder (a positive sample), and y=0 indicates that the $APP_y$ does not belong to the first folder (a negative sample). APP list data (as shown in Table 1) in all folders of all users is counted, and a quantity of samples is n.

TABLE 1

|  | y = 1 | y = 0 | Total |
|---|---|---|---|
| $x_j = 1$ | $n_{11}$ | $n_{10}$ | $n_{1.}$ |
| $x_j = 0$ | $n_{01}$ | $n_{00}$ | $n_{0.}$ |
| Total | $n_{.1}$ | $n_{.0}$ |  |

In Table 1, y is a target variable, and $x_j$ is a prediction variable. The target variable y=1 represents the positive sample, and the target variable y=0 represents the negative sample. The prediction variable $x_j=1$ represents that the $APP_y$ is stored in the first folder, and the prediction variable $x_j=0$ represents that the $APP_y$ is not stored in the first folder. In $n_{ab}$, a first subscript a represents the prediction variable $x_j=1$ or $x_j=0$, and a second subscript b represents the target variable y=1 or y=0. For example, a first subscript 1 in $n_{10}$ represents the prediction variable $x_j=1$, and a second subscript 0 represents the target variable y=0.

According to historical data, a contingency table of any $x_j$ and any $APP_y$ may be obtained. In contingency table data, $n_{11}$ represents a quantity of folders in which both $APP_j$ and $APP_y$ are stored, $n_{01}$ represents a quantity of folders in which the $APP_y$ is stored but the $APP_j$ is not stored, $n_{.1}$ represents a quantity (namely, a positive sample quantity) of folders in which the $APP_y$ is stored, and $n_{.0}$ represents a quantity (namely, a negative sample quantity) of folders in which the $APP_y$ is not stored.

A process in which the electronic device calculates the degree of matching between the third APP and the first folder based on the naive Bayes algorithm may include the following blocks.

Block A1: The electronic device calculates a score that the first folder to which the user applies the first touch operation stores a third APP, where the score is proportional to a conditional probability of y=1 (the positive sample). A naive Bayes formula is:

$$p(y=1|x_1, x_2, \ldots, x_p) = \frac{p(x_1|y=1)p(x_2|y=1)\ldots p(x_p|y=1)p(y=1)}{p(x_1, x_2, \ldots, x_p)}$$

For the first folder, when the electronic device calculates a conditional probability that the first folder stores one idle third $APP_y$, $\vec{x}=(x_1, x_2, \ldots, x_p)$ is fixed, and $\vec{x}=(x_1, x_2, \ldots, x_p)$ is an existing APP sequence in the first folder. Therefore, $p(x_1, x_2, \ldots, x_p)$ may be considered as a constant. In the following, only a conditional probability of storing each idle third $APP_y$ needs to be compared. Therefore, only a numerator part: $p(x_1|y=1)p(x_2|y=1)\ldots p(x_p|y=1)p(y=1)$ of the naive Bayes formula needs to be calculated.

$$p(x_j|y=1) = \frac{n_{11}}{n_{.1}}, p(y=1) = \frac{n_{.1}}{n}, \text{ and } j = 1, 2, \ldots, p.$$

A calculation result of the numerator part of the naive Bayes formula is a score that the first folder stores an idle third $APP_y$.

It should be noted that, when different $p(x_j|y=1)$ are calculated, corresponding contingency table data is different.

Block A2: For each idle third $APP_y$, the electronic device repeats block A1 to obtain, through calculation, a score that the first folder stores each idle third $APP_y$.

The score that the first folder stores the idle third $APP_y$ is a degree of matching between the idle third $APP_y$ and the first folder. To be specific, a third $APP_y$ with a higher score indicates a higher degree of matching the first folder and a higher probability of being stored in the first folder.

For example, after obtaining, through calculation, the score that the first folder stores each idle third $APP_y$, the electronic device may sort, in descending order, the scores that the first folder stores all the idle third $APP_y$s. The electronic device displays, around the first folder based on a sorting result, a third $APP_y$ that is ranked in the front, so that the user selects an APP that needs to be stored in the first folder.

2. The electronic device calculates the degree of matching between the third APP and the first folder based on the association analysis algorithm.

With reference to Table 1 and related content, a process in which the electronic device calculates the degree of matching between the third APP and the first folder based on the association analysis algorithm may include the following blocks.

Block B1: The electronic device calculates a conditional probability that the first folder includes an $APP_j$ (namely, a positive sample), in other words, a degree of matching between the $APP_j$ and the first folder.

The conditional probability that the first folder includes the $APP_j$ is $$p(y=1|x_j=1) = \frac{n_{11}}{n_{1.}},$$

and a conditional probability that the first folder does not include the $APP_j$ is $$p(y=1|x_j=0) = \frac{n_{01}}{n_{0.}}.$$

Block B2: The electronic device calculates a degree of matching between a third $APP_y$ to be stored in the first folder and the first folder.

In some embodiments, the electronic device may add up conditional probabilities that all APPs in the electronic device are included in the first folder $r=\Sigma_j p(y=1|x_j)$, to obtain the degree of matching between the third $APP_y$ and the first folder. r is the degree of matching between the third $APP_y$ and the first folder.

For example, if relationships between four APPs and the first folder are ($x_1=1$, $x_2=0$, $x_3=1$, $x_4=0$), the degree of matching between the second $APP_y$ and the first folder is $r=p(y=1|x_1=1)+p(y=1|x_2=0)+p(y=1|x_3=1)+p(y=1|x_4=0)$.

Block B3: For each third $APP_y$ that is not stored in the first folder, the electronic device repeats block B1 and block B2, to obtain a degree of matching between each third $APP_y$ and the first folder through calculation.

A third $APP_y$ with a higher degree of matching the first folder indicates a higher probability of being stored in the first folder. For example, after obtaining the degree of matching between each third $APP_y$ and the first folder through calculation, the electronic device may sort the degrees of matching between the third $APP_y$s and the first folder in descending order. The electronic device displays, around the first folder based on a sorting result, a third $APP_y$ that is ranked in the front, so that the user selects an APP that needs to be stored in the first folder.

3. The electronic device calculates the degree of matching between the third APP and the first folder based on the TF-IDF statistical method.

The TF-IDF can be used to evaluate an importance degree of a word in a document set or a corpus. A main idea of the TF-IDF is that if a word or a phrase appears frequently in an article (that is, a TF is high) and rarely appears in another article (that is, an IDF is high), it is considered that the word or the phrase has a good category differentiation capability and is suitable for classification.

The following assumes that the corpus already exists, and classification status information of the first folder has been recorded. A process in which the electronic device calculates the degree of matching between the third APP and the first folder based on the TF-IDF statistical method includes the following blocks.

Block C1: The electronic device obtains a name of a third $APP_y$ from a manifest file of each third $APP_y$, and crawls information such as a category and a label of each third $APP_y$ from the application store.

Block C2: The electronic device performs word segmentation processing on the information such as the name of each third $APP_y$ and the category and the label of the third $APP_y$.

One third $APP_y$ corresponds to a plurality of keywords.

Block C3: The electronic device calculates a TF of the keyword of the third $APP_y$.

In some embodiments, for a keyword ti in the first folder, a word frequency of the keyword ti may be expressed as:

$$tf_{i,j} = \frac{n_{i,j}}{\sum_k n_{k,j}}.$$

$n_{i,j}$ represents a quantity of times that the keyword ti appears in the first folder, and $\Sigma_k n_{k,j}$ represents a sum of quantities of times that all words appear in the first folder.

Block C4: The electronic device calculates an IDF of the keyword of the third $APP_y$.

If there are fewer categories including a keyword w, it indicates that the keyword w has a good category differentiation capability. For example, an $IDF_w$ of the keyword w is that a total quantity C of categories is divided by a quantity $C_w$ of categories including the keyword w, and then a logarithm is obtained for a result.

For example, the $IDF_w$ of the keyword w may be $$IDF_w = \log\left(\frac{C}{C_w+1}\right).$$

A denominator is increased by 1 to avoid a case in which the denominator is 0 for an article that does not include a keyword. A stronger capability of the keyword w to predict a topic indicates a greater weight of the keyword w. Conversely, a weaker capability of the keyword w to predict a topic indicates a smaller weight of the keyword w. Therefore, a TF-IDF of the keyword w is: TF–IDF=TF*IDF.

Block C5: The electronic device calculates TF-IDF values of all keywords of the third $APP_y$ relative to the first folder, and averages the TF-IDF values to obtain a TF-IDF of the third $APP_y$ relative to the first folder.

For example, an average value of the TF-IDF values may be:

$$TF-IDF = \frac{\sum_{i=1}^{n} TF-IDF}{n}.$$

Block C6: For each third APP, the electronic device repeats block C3, block C4, and block C5, to obtain, through calculation, TF-IDFs of all third $APP_y$s relative to the first folder.

The TF-IDFs of the first folder and all the third $APP_y$s are degrees of matching between the third $APP_y$s and the first folder. A third $APP_y$ with a higher degree of matching the first folder indicates a higher probability of being stored in the first folder. For example, after obtaining, through calculation, the TF-IDFs of the third $APP_y$s and the first folder, the electronic device may sort the TF-IDFs of the third $APP_y$s relative to the first folder in descending order. The electronic device displays, around the first folder based on a sorting result, a third $APP_y$ that is ranked in the front, so that the user selects an APP that needs to be stored in the first folder.

4. The electronic device calculates the degree of matching between the third APP and the first folder based on a classification label of each first APP in the first folder.

Block D1: The electronic device obtains a quantity of first APPs in the first folder and a quantity of first APPs that are of a same type as a third $APP_y$ in the first folder.

The quantity of first APPs in the first folder is $$\sum_{i=1}^{p} 1,$$

and the quantity of first APPs that are of the same type as the third $APP_y$ in the first folder is $$\sum_{i=1}^{p} I(c_i = x).$$

Block D2: The electronic device calculates a degree of matching between the third $APP_y$ and the first folder.

The degree of matching between the third $APP_y$ and the first folder may be $$\frac{\sum_{i=1}^{p} I(c_i = x)}{\sum_{i=1}^{p} 1}.$$

Block D3: For each third $APP_y$, the electronic device repeats block D1 and block D2, to calculate degrees of matching between all third $APP_y$s and the first folder.

A third $APP_y$ with a higher degree of matching the first folder indicates a higher probability of being stored in the first folder. For example, after obtaining the degree of matching between each third $APP_y$ and the first folder through calculation, the electronic device may sort the degrees of matching between the third $APP_y$s and the first folder in descending order. The electronic device displays, around the first folder based on a sorting result, a third $APP_y$ that is ranked in the front, so that the user selects an APP that needs to be stored in the first folder.

Figure 10:
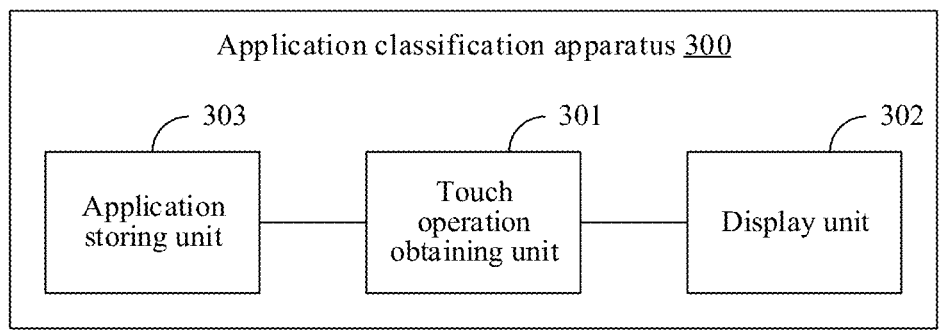
FIG. 10 is a schematic diagram of a structure of an application classification apparatus according to an embodiment of this application.

FIG. 10 is a schematic diagram of a structure of an application classification apparatus 300 according to an embodiment of this application. Refer to FIG. 10. The application classification apparatus 300 may include a touch operation obtaining unit 301 and a display unit 302.

Specifically, the touch operation obtaining unit 301 is configured to obtain a first touch operation performed on a first folder on a display interface. The first folder is any folder on the display interface, and the first folder includes at least one first application. The display unit 302 is configured to display at least one second application around the first folder in response to the first touch operation. The at least one second application is an application that is in a third application and whose degree of matching the first folder is greater than a threshold, and the third application is an application that is not included in any folder on the display interface.

In the application classification apparatus 300, the touch operation obtaining unit 301 obtains the first touch operation performed on the first folder on the display interface. Then, the display unit 302 displays the at least one second application around the first folder in response to the first touch operation. The at least one second application is the application that is in the third application (the application that is not included in any folder on the display interface of the electronic device) and whose degree of matching the first folder is greater than the threshold. Because an application that has a high degree of matching the first folder is displayed around the first folder, an application that is not stored in any folder can be conveniently classified, and the user can directly select an application that the user wants to store in the first folder. In this way, efficiency that the user manages the application can be improved.

In some embodiments, the application classification apparatus 300 may further include an application storing unit 303. Specifically, the touch operation obtaining unit 301 is further configured to obtain a second touch operation performed on a target application. The target application is any application in the at least one second application. The application storing unit 303 is configured to store the target application in the first folder in response to the second touch operation.

Figure 11:
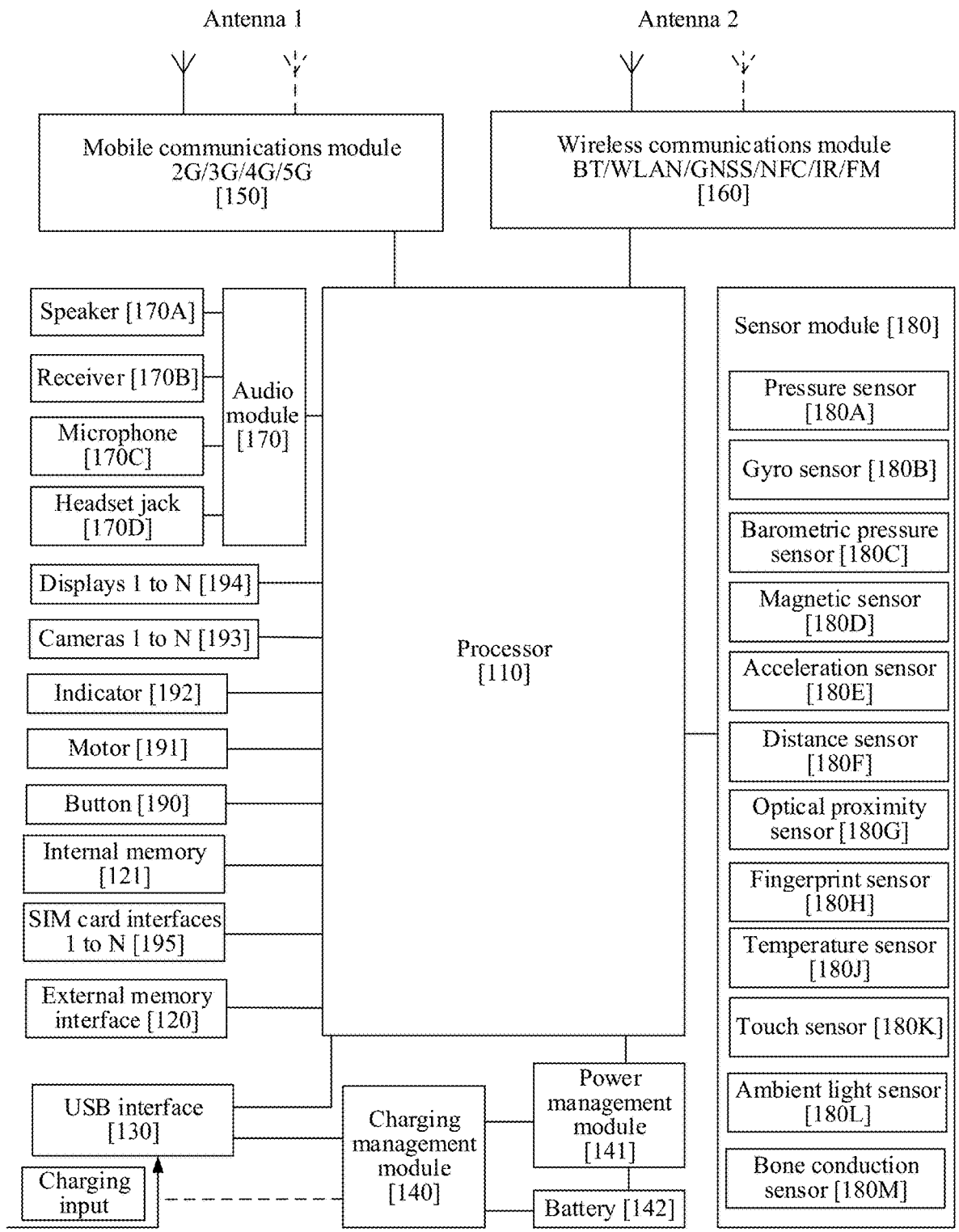
FIG. 11 is a schematic diagram of a hardware architecture of an electronic device according to an embodiment of this application.

FIG. 11 is a schematic diagram of a structure of an electronic device 100 according to an embodiment of this application. Refer to FIG. 11. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component, for example, the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, may be configured to transmit data between the electronic device 100 and a peripheral device, or may be configured to connect to a headset, to play audio by using the headset. The interface may be further configured to connect to another electronic device, for example, an AR device.

It may be understood that an interface connection relationship between modules that are shown in this embodiment of the present disclosure is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that is applied to the electronic device 100 and that includes 2G/3G/4G/5G or the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another functional module.

The wireless communications module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more devices integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, and may further include a nonvolatile memory, for example, at least one magnetic disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may make a sound by moving a human mouth close to the microphone 170C, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects touch operation intensity through the pressure sensor

180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of a leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present disclosure, an Android system of a layered architecture is used as an example to illustrate the software structure of the electronic device 100.

Figure 12:
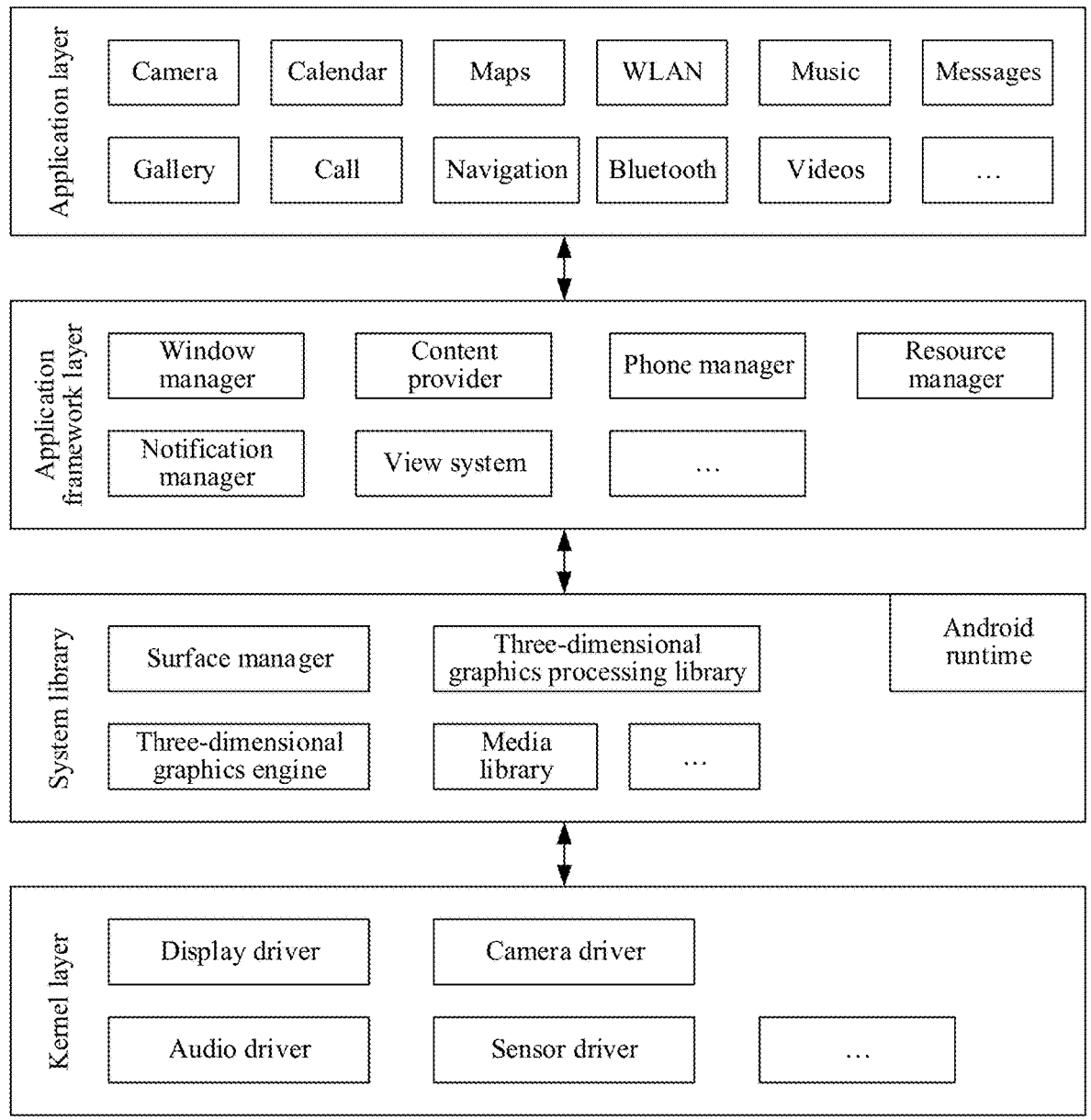
FIG. 12 is a block diagram of a software structure of an electronic device according to an embodiment of this application.

FIG. 12 is a block diagram of a software structure of the electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 12, the application package may include applications such as Camera, Gallery, Calendar, Call, Maps, Navigation, WLAN, Bluetooth, Music, Videos, and Messages.

The application framework layer provides an application programming interface (API) and a programming frame for an application at the application layer. The application framework layer includes some predefined functions.

As shown in FIG. 12, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying a picture. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, and the like).

The resource manager provides various resources such as a localized character string, an icon, a picture, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a performance function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In an embodiment, in some embodiments, an embodiment of this application further provides a computer-readable storage medium. The computer-readable storage medium stores instructions. When the instructions are run on a computer or a processor, the computer or the processor is enabled to perform one or more blocks in any one of the foregoing methods.

In an embodiment, in some embodiments, an embodiment of this application further provides a computer program product including instructions. When the computer program product runs on a computer or a processor, the computer or the processor is enabled to perform one or more blocks in any one of the foregoing methods.

In an embodiment, in some embodiments, an embodiment of this application further provides a chip system. The chip system may include a memory and a processor. The processor executes a computer program stored in the memory, to implement one or more blocks in any one of the foregoing methods. The chip system may be a single chip or a chip module including a plurality of chips.

In an embodiment, in some embodiments, an embodiment of this application further provides a chip system. The chip system may include a processor, the processor is coupled to a memory, and the processor executes a computer program stored in the memory, to implement one or more blocks in any one of the foregoing methods. The chip system may be a single chip or a chip module including a plurality of chips.

In an embodiment, in some embodiments, an embodiment of this application further provides an electronic device, including one or more processors, a memory, and a display. The memory and the display are coupled to the one or more processors. The memory is configured to store computer program code, and the computer program code includes computer instructions. When the one or more processors execute the computer instructions, the electronic device is enabled to perform one or more blocks in any one of the foregoing methods.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive (SSD)), or the like.

A person of ordinary skill in the art may understand that all or some of the procedures of the methods in the foregoing embodiments may be implemented by a computer program instructing related hardware. The program may be stored in a computer-readable storage medium. When the program is executed, the procedures in the foregoing method embodiments may be included. The foregoing storage medium includes any medium that can store program code, such as a ROM, a random access memory RAM, a magnetic disk, or an optical disc.

It should be finally noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An application classification method, comprising:
obtaining, by an electronic device, a first touch operation performed on a first folder on a display interface, wherein the first folder is any folder on the display interface, and the first folder comprises at least one first application; and
displaying, by the electronic device, at least one second application around the first folder in response to the first touch operation, wherein the at least one second application is an application that is of a third application and whose degree of matching the first folder is greater than a threshold, and the third application is an application that is not comprised in any folder on the display interface, wherein the displaying, by the electronic device, at least one second application around the first folder in response to the first touch operation comprises:
determining, by the electronic device, a degree of matching between the third application and the first folder in response to the first touch operation; and
displaying, by the electronic device, the at least one second application around the first folder, wherein the at least one second application is an application that is of the third application and whose degree of matching the first folder meets a preset condition.

2. The method according to claim 1, further comprising:
obtaining, by the electronic device, a second touch operation performed on a target application, wherein the target application is any application in the at least one second application; and
storing, by the electronic device, the target application in the first folder in response to the second touch operation.

3. The method according to claim 1, wherein the first touch operation is a touch operation that is performed on the first folder and meets a preset condition.

4. The method according to claim 3, wherein the preset condition comprises at least one of the following:
- a touch duration of the touch operation is greater than a preset time;
- a quantity of touch points of the touch operation meets a preset quantity requirement; or
- a sliding track of the touch operation meets a preset track.

5. The method according to claim 1, wherein the first touch operation is applying a touch operation to the first folder and simultaneously pressing a first button, wherein the first button is one or more physical buttons in the electronic device, or one or more virtual buttons on the display interface of the electronic device.

6. The method according to claim 1, wherein the determining, by the electronic device, a degree of matching between the third application and the first folder in response to the first touch operation comprises:
- obtaining, by the electronic device, first information in response to the first touch operation, wherein the first information comprises information about the first folder and information about the first application;
- obtaining, by the electronic device, a category and a label of the second application in response to the first touch operation; and
- determining, by the electronic device, the degree of matching between the third application and the first folder based on the category and the label of the third application and the first information.

7. The method according to claim 6, wherein the obtaining, by the electronic device, a category and a label of the third application in response to the first touch operation comprises:
- obtaining, by the electronic device, identification information of the third application in response to the first touch operation; and
- crawling, by the electronic device, the category and the label of the third application from an application store based on the identification information of the third application.

8. The method according to claim 6, wherein the determining, by the electronic device, the degree of matching between the third application and the first folder based on the category and the label of the third application and the first information comprises:
- performing, by the electronic device, word segmentation processing on identification information, the category, and the label of the third application; and
- calculating, by the electronic device, the degree of matching between the third application and the first folder based on a word segmentation processing result.

9. The method according to claim 8, wherein the calculating, by the electronic device, the degree of matching between the third application and the first folder based on a word segmentation processing result comprises:
- calculating, by the electronic device, the degree of matching between the third application and the first folder by using a preset algorithm based on the word segmentation processing result, wherein the preset algorithm is one or more of a naive Bayes algorithm, an association analysis algorithm, and a TF-IDF statistical algorithm.

10. The method according to claim 8, wherein the displaying, by the electronic device, the at least one second application around the first folder comprises:
- determining, by the electronic device, a plurality of applications that are of the third application and that have highest degrees of matching the first folder as a plurality of second applications; and
- displaying, by the electronic device, the plurality of second applications around the first folder in a preset arrangement manner.

11. The method according to claim 10, wherein the displaying the plurality of second applications around the first folder in a preset arrangement manner comprises:
- arranging the plurality of second applications into a preset shape in descending order of the degrees of matching, and displaying the second applications around the first folder.

12. The method according to claim 11, wherein the plurality of second applications are distributed as a first-layer application and a second-layer application, and each of the first-layer application and the second-layer application comprises at least one of the plurality of second applications, wherein the first-layer application is close to the first folder relative to the second-layer application.

13. An electronic device, comprising one or more processors, a memory, and a display, wherein
- the memory and the display are coupled to the one or more processors, the memory is configured to store computer program code, and the computer program code comprises computer instructions; and
- when the one or more processors execute the computer instructions, the electronic device is enabled to perform operations:
- obtaining, by an electronic device, a first touch operation performed on a first folder on a display interface, wherein the first folder is any folder on the display interface, and the first folder comprises at least one first application; and
- displaying, by the electronic device, at least one second application around the first folder in response to the first touch operation, wherein the at least one second application is an application that is of a third application and whose degree of matching the first folder is greater than a threshold, and the third application is an application that is not comprised in any folder on the display interface, wherein the displaying, by the electronic device, at least one second application around the first folder in response to the first touch operation comprises:
- determining, by the electronic device, a degree of matching between the third application and the first folder in response to the first touch operation; and
- displaying, by the electronic device, the at least one second application around the first folder, wherein the at least one second application is an application that is of the third application and whose degree of matching the first folder meets a preset condition.

14. A chip system, wherein the chip system comprises one or more processors, the processors are coupled to a memory, and the processors execute a computer program stored in the memory to perform operations:
- obtaining, by an electronic device, a first touch operation performed on a first folder on a display interface, wherein the first folder is any folder on the display interface, and the first folder comprises at least one first application; and
- displaying, by the electronic device, at least one second application around the first folder in response to the first touch operation, wherein the at least one second application is an application that is of a third application and whose degree of matching the first folder is greater than a threshold, and the third application is an application that is not comprised in any folder on the display interface, wherein the displaying, by the electronic device, at least one second application around the first folder in response to the first touch operation comprises:

determining, by the electronic device, a degree of matching between the third application and the first folder in response to the first touch operation; and displaying, by the electronic device, the at least one second application around the first folder, wherein the at least one second application is an application that is of the third application and whose degree of matching the first folder meets a preset condition.

15. The electronic device according to claim 13, wherein the first touch operation is a touch operation that is performed on the first folder and meets a preset condition.

16. The electronic device according to claim 15, wherein the preset condition comprises at least one of the following:
   a touch duration of the touch operation is greater than a preset time;
   a quantity of touch points of the touch operation meets a preset quantity requirement; or
   a sliding track of the touch operation meets a preset track.

17. The chip system according to claim 14, wherein the first touch operation is a touch operation that is performed on the first folder and meets a preset condition.

18. The chip system according to claim 17, wherein the preset condition comprises at least one of the following:
   a touch duration of the touch operation is greater than a preset time;
   a quantity of touch points of the touch operation meets a preset quantity requirement; or
   a sliding track of the touch operation meets a preset track.

* * * * *